United States Patent [19]

Hattori et al.

[11] Patent Number: 6,011,580
[45] Date of Patent: Jan. 4, 2000

[54] IMAGE DISPLAY APPARATUS

[75] Inventors: Tomohiko Hattori; Shigeru Omori; Kunimasa Katayama; Sadayuki Sakuma, all of Nakai-machi, Japan

[73] Assignee: Terumo Kabushiki Kaisha, Tokyo, Japan

[21] Appl. No.: 08/470,721

[22] Filed: Jun. 6, 1995

[30] Foreign Application Priority Data

Jun. 7, 1994 [JP] Japan .................................. 6-124944
Dec. 2, 1994 [JP] Japan .................................. 6-299864

[51] Int. Cl.$^7$ .................................................. H04N 13/04
[52] U.S. Cl. ........................................ 348/57; 359/465
[58] Field of Search ................................ 348/51, 54, 55, 348/56, 57; 359/465; H04N 13/04

[56] References Cited

U.S. PATENT DOCUMENTS 3,128,339  4/1964  Wupper .
4,385,316  5/1983  Yanagisawa .
4,535,354  8/1985  Rickert .

(List continued on next page.)

FOREIGN PATENT DOCUMENTS 0 505 998A3   9/1992  European Pat. Off. .
0 576 106A1  12/1993  European Pat. Off. .
0 595 023A1   5/1994  European Pat. Off. .
0 601 308A1   6/1994  European Pat. Off. .
0 602 934 A2  6/1994  European Pat. Off. .
0 602 934A2   6/1994  European Pat. Off. .
41 02 895C1   1/1992  Germany .
93 00 765     5/1993  Germany .
63-127777     5/1988  Japan .
5-22722       1/1993  Japan .
2 111 798     7/1983  United Kingdom .
2206763       1/1989  United Kingdom .
83/02169      6/1983  WIPO .
WO 83/02169   6/1983  WIPO .
WO 93/19394  10/1993  WIPO .

OTHER PUBLICATIONS

Abstract: Alfred Schwartz, 1985 International Display Research Conference; "Head Tracking Stereoscopic Display"; CH2239–2/85/0000–0141 1985 IEEE.

J.R. Moore, "The Implementation of a Multi–view Autostereoscopic Display", *Image Technology*, Jan.–Feb. 1983.

Karen E. Jachimowicz, "Stereoscopic (3–D) projection display using polarized color multiplexing", *Optical Engineering*, vol. 29, No. 8, Aug. 1990.

K. Yamamoto, et al., "Automatic Viewing Range Tracing Method for Communication Equipment", IEEE Transactions on Consumer Electronics, Aug. 1991, No. 3, vol. 37, pp. 424–431.

*Primary Examiner*—Howard Britton
*Attorney, Agent, or Firm*—Burns, Doane, Swecker & Mathis, LLP

[57] ABSTRACT

A stereoscopic image display apparatus including a liquid crystal display of light transmission type for displaying right-eye and left-eye target images, a pair of CRTs for displaying illuminating graphic patterns for illuminating the display from the back surface, and a Fresnel lens 11 arranged before the CRTs to show the viewer given displayed portions on the display screens of these CRTs in an enlarged scale. A first graphic pattern polarized in the X direction is displayed at a first position, which corresponds to the right eye of the viewer, on the display screen of the first CRT. A second graphic pattern polarized in the Y direction perpendicular to the X direction is displayed at a second position, which corresponds to the left eye of the viewer, on the second CRT. The display screen of the liquid crystal display is illuminated from the behind by the light from the first and second graphic patterns displayed on the CRTs, respectively. The liquid crystal display displays the right-eye target image and the left-eye target image such that the polarizing directions of the right- and left-eye target images agree with the polarizing directions of the first and second graphic patterns, respectively.

13 Claims, 29 Drawing Sheets

U.S. PATENT DOCUMENTS

| | | |
|---|---|---|
| 4,641,178 | 2/1987 | Street . |
| 4,647,966 | 3/1987 | Phillips et al. . |
| 4,649,425 | 3/1987 | Pund .......................................... 348/52 |
| 4,717,949 | 1/1988 | Eichenlaub . |
| 4,829,365 | 5/1989 | Eichenlaub . |
| 4,870,600 | 9/1989 | Hiraoka . |
| 4,890,902 | 1/1990 | Doane et al. . |
| 4,922,336 | 5/1990 | Morton . |
| 4,962,422 | 10/1990 | Ohtomo et al. . |
| 4,987,487 | 1/1991 | Ichinose et al. . |
| 5,008,658 | 4/1991 | Russay et al. . |
| 5,032,912 | 7/1991 | Sekariassen . |
| 5,059,957 | 10/1991 | Todoriki et al. . |
| 5,132,839 | 7/1992 | Travis . |
| 5,162,785 | 11/1992 | Fagard . |
| 5,311,220 | 5/1994 | Eichenlaub ................................ 348/55 |
| 5,315,377 | 5/1994 | Isono et al. . |
| 5,365,370 | 11/1994 | Hudgins . |
| 5,408,264 | 4/1995 | Kurata et al. . |
| 5,410,609 | 4/1995 | Kado et al. . |
| 5,421,589 | 6/1995 | Monroe . |
| 5,430,474 | 7/1995 | Hines . |
| 5,430,809 | 7/1995 | Tomitaka . |
| 5,457,574 | 10/1995 | Eichenlaub . |
| 5,459,605 | 10/1995 | Kempf . |
| 5,494,483 | 2/1996 | Adair . |
| 5,499,303 | 3/1996 | Hundt et al. . |
| 5,568,314 | 10/1996 | Omori ...................................... 348/51 |
| 5,754,900 | 5/1998 | Suda . |
| 5,774,175 | 6/1998 | Hattori ..................................... 348/55 |

F I G. 11A 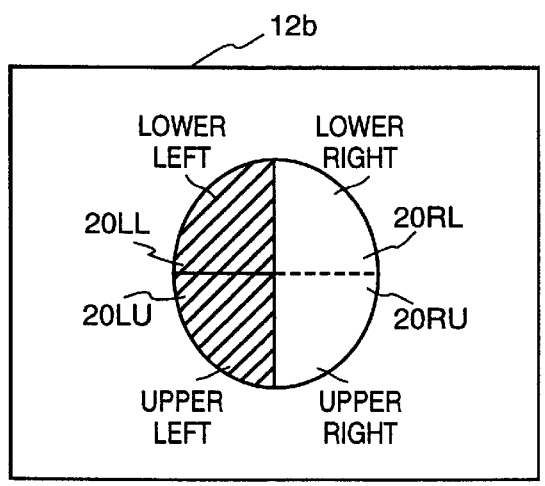
F I G. 11B 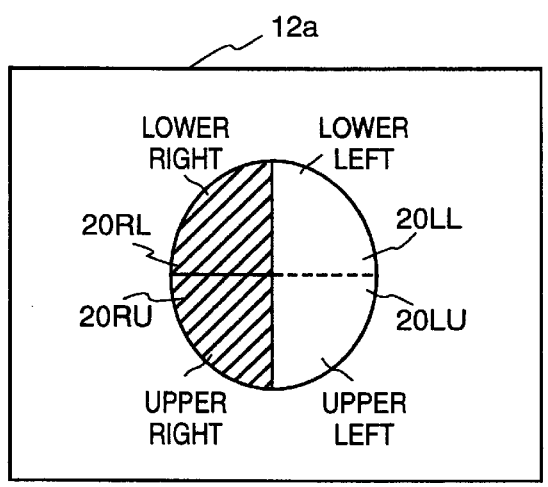

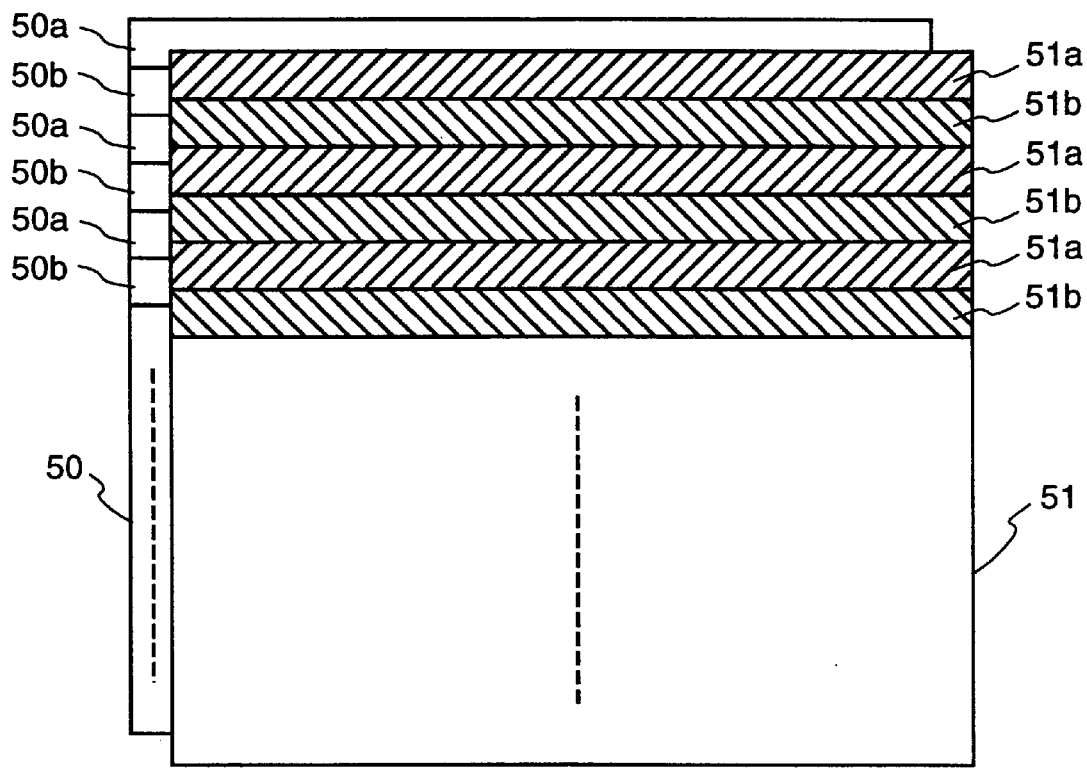
FIG. 13
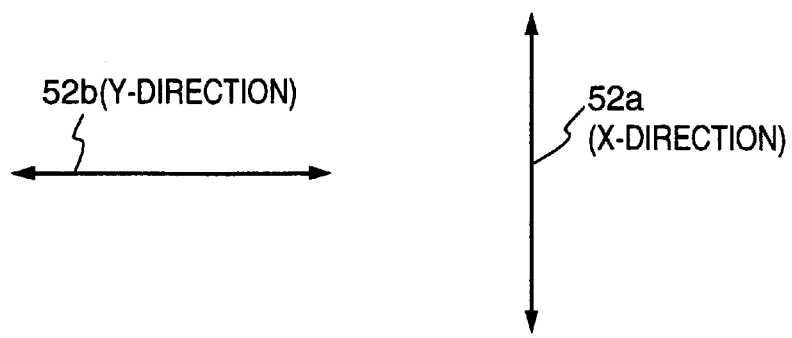

F I G. 20
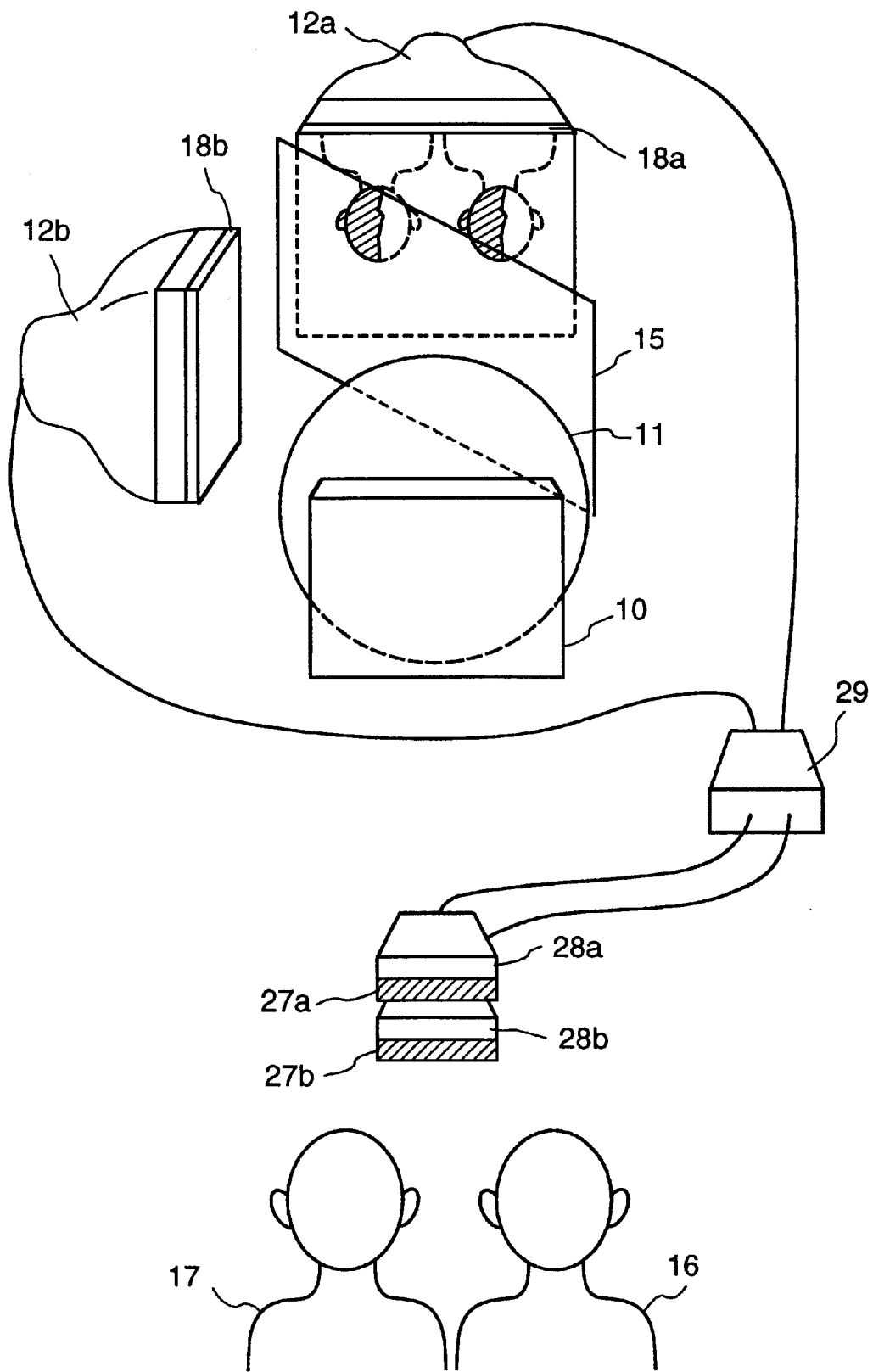

IMAGE DISPLAY APPARATUS

BACKGROUND OF THE INVENTION

The present invention relates to an image display apparatus for medical, industrial, or domestic purpose and, more particularly, to an image display apparatus which shows the viewer two target images different from each other.

Conventional stereoscopic image display apparatuses are generally classified into two categories. One is an apparatus by which the viewer wears spectacles having a function of dividing an image into right and left images. The viewer can view stereoscopic images for the right eye and the left eye, which are time-divisionally displayed on the image display screen, with the right eye and the left eye alone, respectively. The other is an apparatus in which a lenticular plate is adhered on the image display screen. With the image dividing function of this lenticular plate, the viewer can view stereoscopic images for the right eye and the left eye with the right eye and the left eye alone, respectively.

FIG. 1 shows the arrangement of one example of the conventional stereoscopic image display apparatuses as described above. Reference numeral 60 denotes spectacles having the function of dividing an image into right and left images; 61a and 61b, liquid crystal shutters; 62, a synchronous circuit; and 63, a color CRT as an image display apparatus.

The operation of the stereoscopic image display apparatus according to the first conventional example with the above arrangement will be described below. The color CRT 63 time-divisionally, alternately displays stereoscopic images for the right eye and the left eye. The liquid crystal shutter 61a of the spectacles 60 is opened into a transmitting state only when the right-eye stereoscopic images are displayed. The liquid crystal shutter 61b is opened into a transmitting state only when the left-eye stereoscopic images are displayed. The shutters 61a and 61b are thus controlled by the synchronous circuit 62. This allows a viewer wearing the spectacles 60 to view only the right-eye stereoscopic images with the right eye and only the left-eye stereoscopic images with the left eye. As a result, a stereoscopic vision is obtained.

FIG. 2A shows the arrangement of a stereoscopic image display apparatus according to a second conventional example. Reference numeral 71 denotes a lenticular plate consisting of a number of cylindrical lenses formed into stripes; and 72, a color CRT as an image display apparatus.

The operation of the stereoscopic image display apparatus according to the second conventional example with the above arrangement will be described below. The color CRT 72 displays stereoscopic images for the right eye and the left eye at alternate arbitrary positions arranged into slit-like shapes each having a width nearly one half of the stripe width of the lenticular plate 71. Through the individual cylindrical lenses of the lenticular plate 71, the right eye of the viewer views only the right-eye stereoscopic images displayed in the slit-like shapes, and the left eye of the viewer views only the left-eye stereoscopic images displayed in the slit-like shapes. Consequently, a stereoscopic vision is attained.

Unfortunately, in the stereoscopic image display apparatus of the first conventional example described above, the spectacles having the function of dividing an image into right and left images is essential in order to permit the right and left eyes of the viewer to independently view the stereoscopic images. Wearing these spectacles is troublesome to the viewer. In addition, flicker occurs in the displayed stereoscopic images since it is necessary to time-divisionally switch the right- and left-eye stereoscopic images. This is an obstacle in viewing the stereoscopic images.

On the other hand, in the stereoscopic image display apparatus of the second conventional example the viewer views stereoscopic images through the stripe lenses. Consequently, the allowable range of the position of the viewer at which the stereoscopic vision is possible is narrowed. The result is severe limitations that images degrade when the viewer moves, and it is difficult for a large number of viewers at arbitrary positions to view the stereoscopic images. Also, the apparatus is expensive because image processing for displaying stripe images is required.

SUMMARY OF THE INVENTION

It is an object of the present invention to provide an image display apparatus capable of allowing the right and left eyes of a viewer to see two different images without using the spectacles of the above-mentioned prior art which have the function of dividing an image into right and left images.

It is an other object of the present invention to provide an image display apparatus capable of presenting two different images to a large number of viewers at the same time regardless of the positions of the viewers, and having a flicker-free display.

The above objects of the present invention are achieved by providing an image display apparatus which shows a viewer a first image and a second image different from the first image, said apparatus comprising:

a spatial modulation device of light transmission type, for displaying the first and second images so that areas of the spatial modulation device displaying the images exhibit different transmission characteristics for polarized light from each other;

a back lighting device arranged behind said spatial modulation device for illuminating said spatial modulation device from a back surface, said back lighting device displaying first and second graphic patterns at respective locations thereof corresponding to the viewer's right and left eyes, respectively; and an optical element arranged before said back lighting device to provide the viewer's right and left eyes with light beams from the first and second graphic patterns, respectively, wherein said back lighting device displays the first and second graphic patterns so that the first and second graphic patterns have respective polarization characteristics which match the transmission characteristics for polarized light of the first and second images displayed on the spatial modulation device.

According to the image display apparatus with the above arrangement, the first and second graphic patterns displayed by the back lighting device function as back light sources for the first and second images displayed by the spatial modulation device. In addition, the spatial modulation device displays the first and second images on the display screen such that the first and second images have polarized light transmission characteristics matching the polarization characteristics of the first and second graphic patterns, respectively. Consequently, the right eye of the viewer sees the first image which is back-lighted by the first graphic pattern, and the left eye of the viewer sees the second image which is back-lighted by the second graphic pattern.

In particular, the first and second graphic patterns are so displayed as to have polarization characteristics in different directions, preferably in substantially orthogonal directions. The right eye of the viewer sees an enlarge virtual image of the first graphic pattern through the optical element, and the left eye of the viewer sees a virtual image of the second graphic pattern through the optical element. These two virtual images act as back lights for the spatial modulation device for displaying the first and second images. In this case the spatial modulation device displays the right-eye target image (=the first image) and the left-eye target image (=the second image) having polarized light transmission characteristics matching the polarization characteristics of the first and second graphic patterns, respectively. Consequently, the first graphic pattern acts as a back light only for the right-eye target image, and the second graphic pattern acts as a back light only for the left-eye target image. Therefore, the right-eye target image is viewed by the right eye alone, and the left-eye target image is viewed by the left eye alone.

The display apparatus can be so designed as to function as a simple light-emitting apparatus. However, it is more desirable that the display apparatus be an image display apparatus, such as a CRT display, capable of displaying moving images, and that the first and second graphic patterns move in accordance with the movement of the viewer. If, however, the display apparatus is a simple light-emitting apparatus, a position at which the viewer can view the first and second images is extremely limited, so it is necessary to indicate a suitable viewing position to the viewer. Therefore, according to one preferred aspect of the present invention, this display apparatus includes indicating means for indicating an optimum viewing position to the viewer. In this case a viewing position of the viewer, at which the first position where the first graphic pattern is displayed corresponds to the right eye of the viewer and the second position where the second graphic pattern is displayed corresponds to the left eye of the viewer, is set as the optimum viewing position.

According to another preferred aspect of the present invention, the indicating means includes a sighting device for allowing an eye to sight a predetermined target.

According to still another preferred aspect of the present invention, the image display apparatus further comprises:
  detecting means for detecting a position of the viewer; and
  means for moving the display positions of the first and second graphic patterns on the back lighting device in accordance with the position detected by the detecting means. When a plurality of viewers at different positions view the first and second images at the same time, or when the viewer views the first and second images while changing the viewing position, the above arrangement makes it possible to selectively provide the first and second images to the right and left eyes of these viewers.

According to still another preferred aspect of the present invention, the detecting means includes
  an illuminating device for illuminating the viewer,
  an image sensing device for sensing the illuminated viewer, and
  means for separating a right-half region and a left-half region of an image of the face of the viewer, and
  the spatial modulation device displays the images of the right-half face region and the left-half face region of the viewer obtained by the image sensing device as the first and second graphic patterns, respectively. That is, it is readily possible to generate the first and second graphic patterns by the use of the symmetry of the face of a human. Accordingly, a stereoscopic vision can be easily provided.

Note that although the right- and left-half face images can be directly used as the first and second graphic patterns, it is also possible to use graphic patterns formed by performing image processing for these face images in order to make the graphic shape and the contrast more suitable for illumination.

According to still another preferred aspect of the present invention, the detecting means includes
  an illuminating device for illuminating the viewer,
  an image sensing device for sensing the illuminated viewer, and
  the image display apparatus further comprises:
    means for generating one of the first and second graphic patterns on the basis of one of right- and left-half images of the face of the viewer obtained by the image sensing device. That is, it is readily possible to generate the first graphic pattern by the use of the symmetry of the face of a human, and to generate the second graphic pattern from the first graphic pattern. Accordingly, a stereoscopic vision can be easily provided.

According to still another preferred aspect of the present invention, the detecting means includes
  means for irradiating an ultrasonic wave,
  means for detecting an echo of the ultrasonic wave, and
  means for detecting the position of the face of the viewer from the echo signal. By the use of the ultrasonic wave it is possible to prevent crosstalk which can occur between the right and left eyes of the viewer.

According to still another preferred aspect of the present invention, the illuminating device emits infrared radiation.

According to still another preferred aspect of the present invention, the illuminating device irradiates two infrared beams having different wavelength bands onto right- and left-half portions of the face of the viewer, and the separating means has two infrared filters provided in the image sensing device. The use of the infrared beams does not bother the viewer. Also, since the infrared beams having different wavelength bands are used, images of the right- and left-half portions of the face of the viewer can be separately obtained with relative ease.

According to still another preferred aspect of the present invention, the spatial modulation device has a liquid crystal display for simultaneously displaying the first and second images.

According to still another preferred aspect of the present invention, the liquid crystal display comprises:
  a display screen having a first display region including a large number of fine display regions, and a second display region including a large number of fine display regions mixed with the fine display regions of the first display region; and
  a polarizer having a first polarizing region which is a polarizing region provided behind the first display region and has a large number of polarizing units in a one-to-one correspondence with the fine display regions of the first display region, and a second polarizing region which is a polarizing region provided behind the second display region and has a large number of polarizing units in a one-to-one correspondence with the fine display regions of the second display region.

In the image display apparatus with the above arrangement, the liquid crystal display can display the first and second images on the same display screen. This contributes to the miniaturization of the apparatus. Additionally, since the individual display regions are fine, the first and second images are not separately viewed by the viewer.

According to still another preferred aspect of the present invention, the fine display regions of the first display region are band-like display portions divided along a horizontal or vertical direction of the display screen of the liquid crystal display.

According to still another preferred aspect of the present invention, the back lighting device has two light-emitting regions divided at substantially the center in the horizontal direction, one light-emitting region emitting polarized light with the first polarization characteristic, and the other light-emitting region emitting polarized light with the second polarization characteristic.

According to still another aspect of the present invention, the back lighting device comprises:
  a plurality of light-emitting elements capable of selectively emitting polarized light with the first polarization characteristic or polarized light with the second polarization characteristic upon being selectively applied with two voltage values;
  means for extracting a region corresponding to the right eye of the viewer from the face image of the viewer obtained by the sensing means; and
  means for applying a first voltage value to a display region on the back lighting device, which corresponds to the extracted region corresponding to the right eye, thereby causing the display region to display the first graphic pattern, and applying a second voltage value to a display region on the back lighting device, which corresponds to a region other than the extracted region corresponding to the right eye, thereby causing the display region to display the second graphic pattern.

This back lighting device for displaying the back light graphic patterns can display both the first and second graphic patterns on the same display screen only by giving two logical values to the first and second graphic patterns.

According to still another preferred aspect of the present invention, polarizing axes of polarized light components of the first and second graphic patterns are substantially orthogonal to each other.

According to still another preferred aspect of the present invention, the image display apparatus further comprises synthesizing means for synthesizing two image light components by aligning optical axes of the image light components,
  wherein the back lighting device comprises
    a first display unit for emitting light which is transmitted through the half mirror,
    a second display unit for emitting light which is reflected by the half mirror,
    a polarizer provided on a display screen of the first display unit to impart the first polarization characteristic to the light emitted by the first display unit, and
    a polarizer provided on a display screen of the second display unit to impart the second polarization characteristic to the light emitted by the second display unit, and
  displays the first graphic pattern on the first display unit and the second graphic pattern on the second display unit. In the image display apparatus with this arrangement, the first and second graphic patterns are once displayed on separate display units (e.g., a CRT display), and the light components from the first and second graphic patterns displayed are synthesized by the mirror after they are polarized. This ensures the separation of the respective back lights for first and second graphic patterns.

According to still another preferred aspect of the present invention, the synthesizing means comprises a half mirror.

According to still another preferred aspect of the present invention, the image display apparatus further comprises a screen onto which two image light components are projected,
  wherein the back lighting device comprises
    a first display projector for displaying the first graphic pattern and projecting image light from the first graphic pattern onto the screen,
    a second display projector for displaying the second graphic pattern and projecting image light from the second graphic pattern onto the screen,
    a polarizer provided on a front surface of the first display projector to impart the first polarization characteristic to the light emitted by the first display projector, and
    a polarizer provided on a front surface of the second display projector to impart the second polarization characteristic to the light emitted by the second display projector. This arrangement ensures the separation of the back lights for the first and second graphic patterns.

According to still another preferred aspect of the present invention, the back lighting device comprises:
  a plurality of light-emitting elements capable of selectively emitting polarized light with the first polarization characteristic or polarized light with the second polarization characteristic upon being selectively applied with two voltage values; and
  means for generating the first graphic pattern from a right-half image of the face of the viewer obtained by the sensing means and applying a first voltage value to pixels corresponding to the first graphic pattern, thereby displaying the first graphic pattern on the screen of the back lighting device, and generating the second graphic pattern from a left-half image of the face of the viewer obtained by the sensing means and applying a second voltage value to pixels corresponding to the second graphic pattern, thereby displaying the second graphic pattern on the screen of the back lighting device.

According to still another preferred aspect of the present invention, the display screen of the back lighting device is preferably arranged outside a focal length of the optical element. This is so because the graphic pattern as a back light can function as an ideal back light source, since the pattern is displayed in an enlarged scale to the viewer.

According to still another preferred aspect of the present invention, the optical element has directivity.

According to still another preferred aspect of the present invention, the optical element is a convex lens, a Fresnel convex lens, a holographic lens, a diffraction grating lens, a monofoc lens, or a concave mirror.

The case in which a convex lens is used as the optical element will be described in detail below. The illuminating graphic pattern corresponding to the right- or left-half portion of the face of the viewer is fully enlarged to the size of the lens by the enlarging action of the lens, and the lens shows the viewer this enlarged graphic pattern. Consequently, the graphic pattern of the right-half face of the viewer, which is displayed on the back lighting device, is seen by the right eye of the viewer as it is fully enlarged to the size of the lens. Likewise, the graphic pattern of the left-half face of the viewer, which is displayed on the illuminating graphic pattern back lighting device, is seen by the left eye of the viewer as it is fully enlarged to the size of the lens. Assume that the graphic patterns of the right- and left-half face images of the viewer displayed in the back lighting device have different polarized light transmission characteristics, that the first graphic pattern and the right-eye target image have the same polarization characteristic, and that the second graphic pattern and the left-eye target image have the same polarization characteristic. In this case the right eye sees the right-eye target image displayed on the spatial modulation device, since the image is illuminated from the back side by the first graphic pattern. However, the second graphic pattern cannot illuminate the right-eye target image because the polarizing direction is different. Accordingly, the left eye cannot see the right-eye target image. Conversely, the right eye cannot see the left-eye target image, although the left eye can see the left-eye target image. This makes it possible to cause the right eye to see only the right-eye target image and the left eye to see only the left-eye target image.

According to still another preferred aspect of the present invention, the image display apparatus of the present invention is applied to an endoscope which includes a pair of lens barrels for sensing and guiding an image of an object to be stereoscopically viewed in two directions, and a pair of image pickup devices for converting a pair of picked up object images into electrical signals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11A is a view for explaining generation of the left-eye back light images to be displayed on the CRT 12*b*;

FIG. 11B is a view for explaining generation of the right-eye back light images to be displayed on the CRT 12*a*;

FIG. 13 is a view showing the arrangement of the display unit of a transmission display 10 as a spatial modulation device for use in the stereoscopic image display apparatus according to the first embodiment of the present invention;

FIG. 20 is a view showing the arrangement of a stereoscopic image display apparatus according to the fourth embodiment of the present invention;

DETAILED DESCRIPTION OF THE PREFERRED EMBODIMENTS

Seven preferred embodiments of the present invention will be described in detail below with reference to the accompanying drawings. In these seven embodiments the image display apparatus of the present invention is applied to a stereoscopic image display apparatus.

Figure 1:
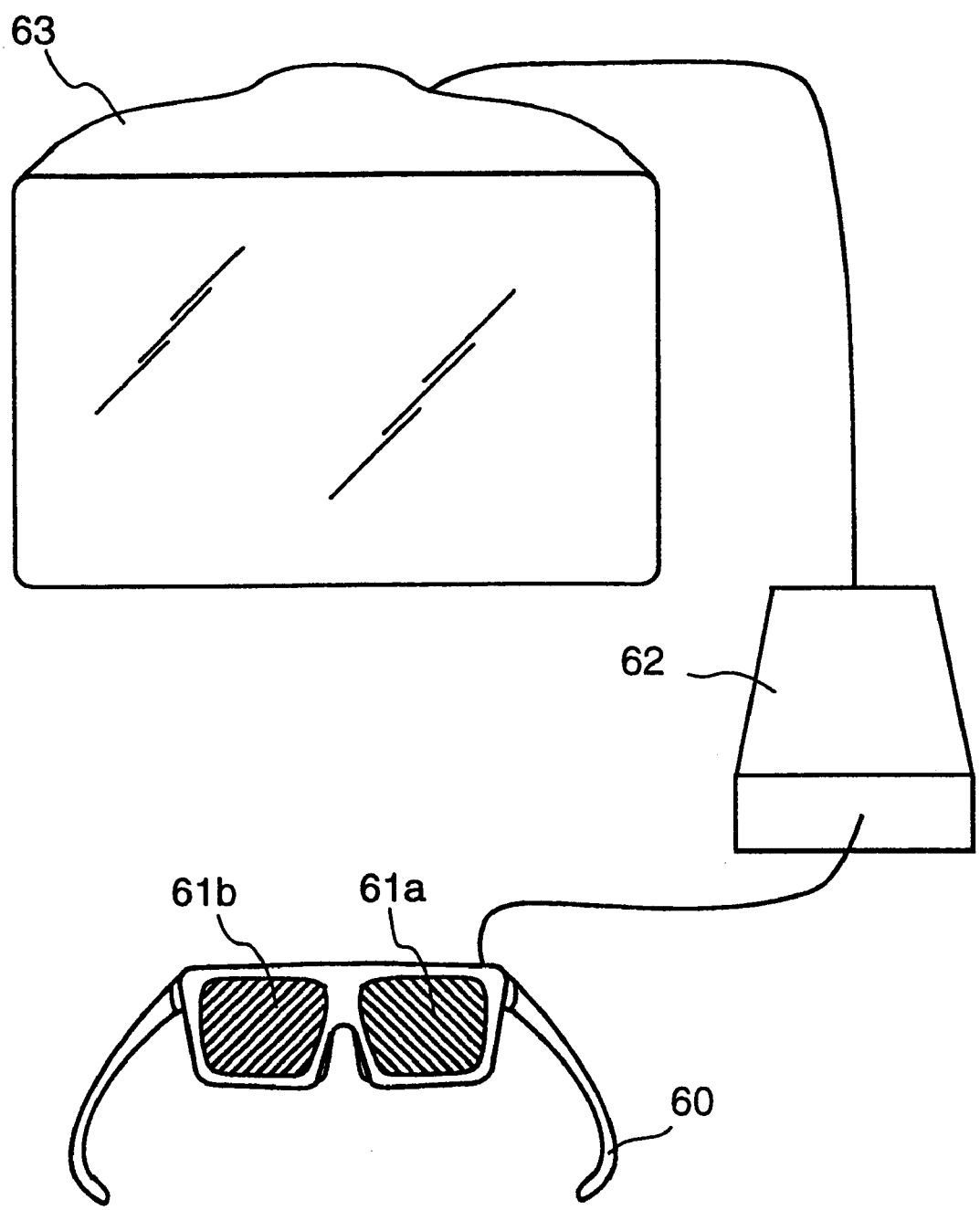
FIG. 1 is a view showing the arrangement of a stereoscopic image display apparatus according to the first conventional example.
Figure 2A:
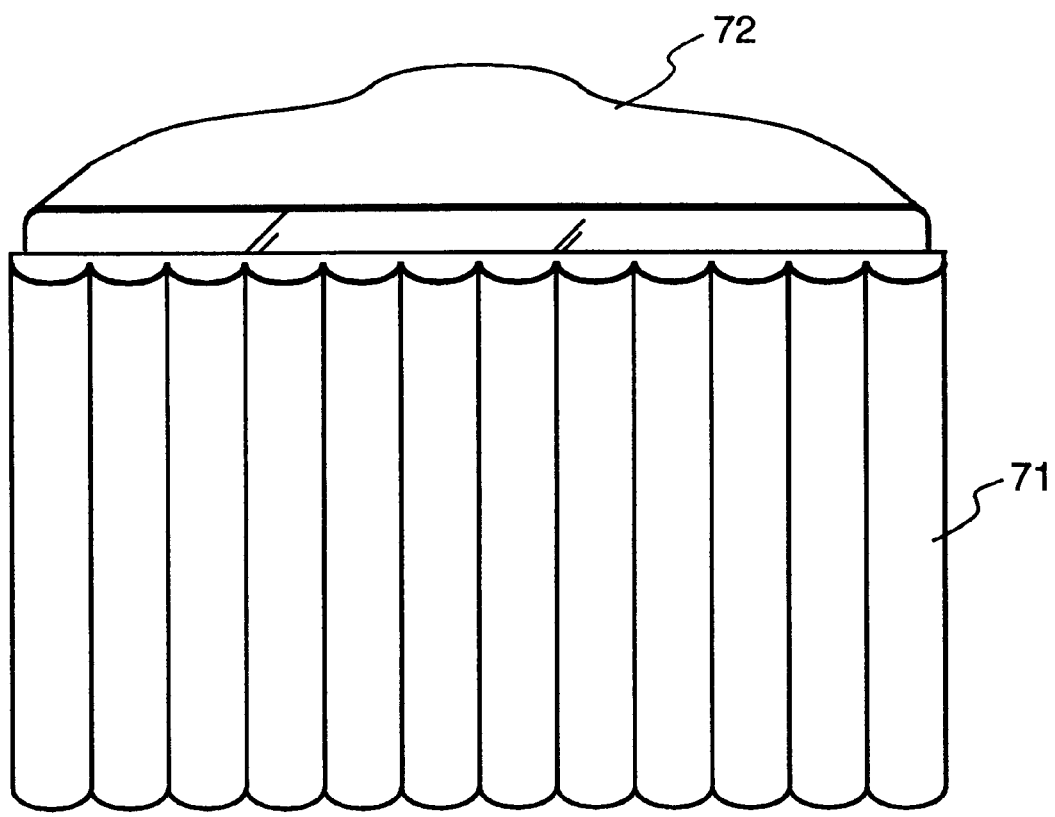
FIG. 2A is a view showing the arrangement of a stereoscopic image display apparatus according to the second conventional example.
Figure 2B:
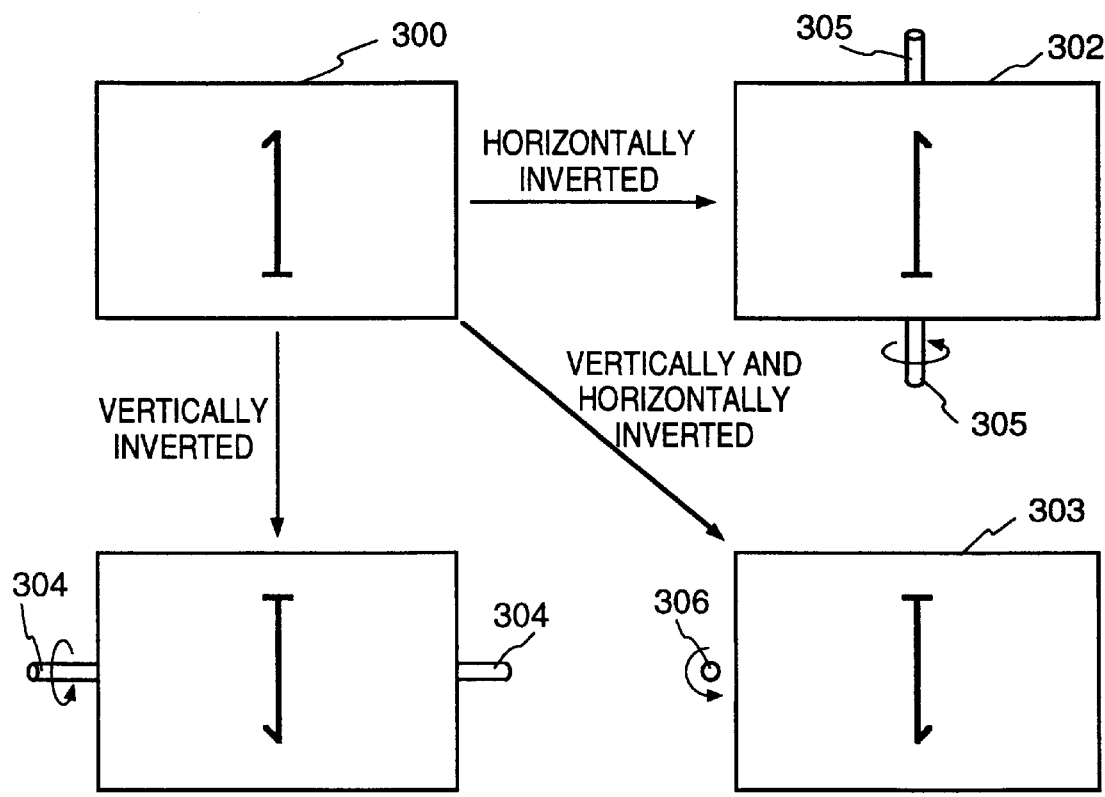
FIG. 2B is a view for explaining the definitions of inversion of an image in display apparatuses of the embodiments.

In the following explanation of the embodiments, the "vertical direction" of a display apparatus means the "direction of height" of the display screen of the display apparatus in the state of normal use. Likewise, the "horizontal direction" means the "direction of width" of the display screen in such state. FIG. 2B explains the definitions of "inversion in the vertical direction" and "inversion in the horizontal direction", of images in various embodiments of the present invention. In FIG. 2B, when an image 300 (in which a figure "1" is displayed) is "inverted in the vertical direction", the image is displayed as indicated by reference numeral 301. When "inverted in the horizontal direction" the image 300 is displayed as indicated by 302. When "inverted in the vertical and horizontal directions" the image 300 is displayed as indicated by 303.

In the following embodiments, images are displayed as they are inverted in various directions, and these inversions are in effect accomplished by various methods. As an example, the image 301 which is inverted in the vertical direction can be obtained by "inverting" the image data in the "vertical direction" in a memory or by rotating the display unit 180° about a rotating axis 304. Analogously, the image 302 which is inverted in the horizontal direction can be obtained by "inverting" the image data in the "horizontal direction" in the memory or by rotating the display unit 180° about a rotating axis 305. In a similar fashion, the image 303 which is inverted in the vertical and horizontal directions can be obtained by "inverting" the image data in the "vertical and horizontal directions" in the memory or by rotating the display unit 180° about a rotating axis 306.

In the explanation of the following embodiments, therefore, the term "image inversion" involves both obtaining an inverted image by electronically manipulating the image data, and inverting an image by physically rotating the display apparatus.

First Embodiment

Figure 3:
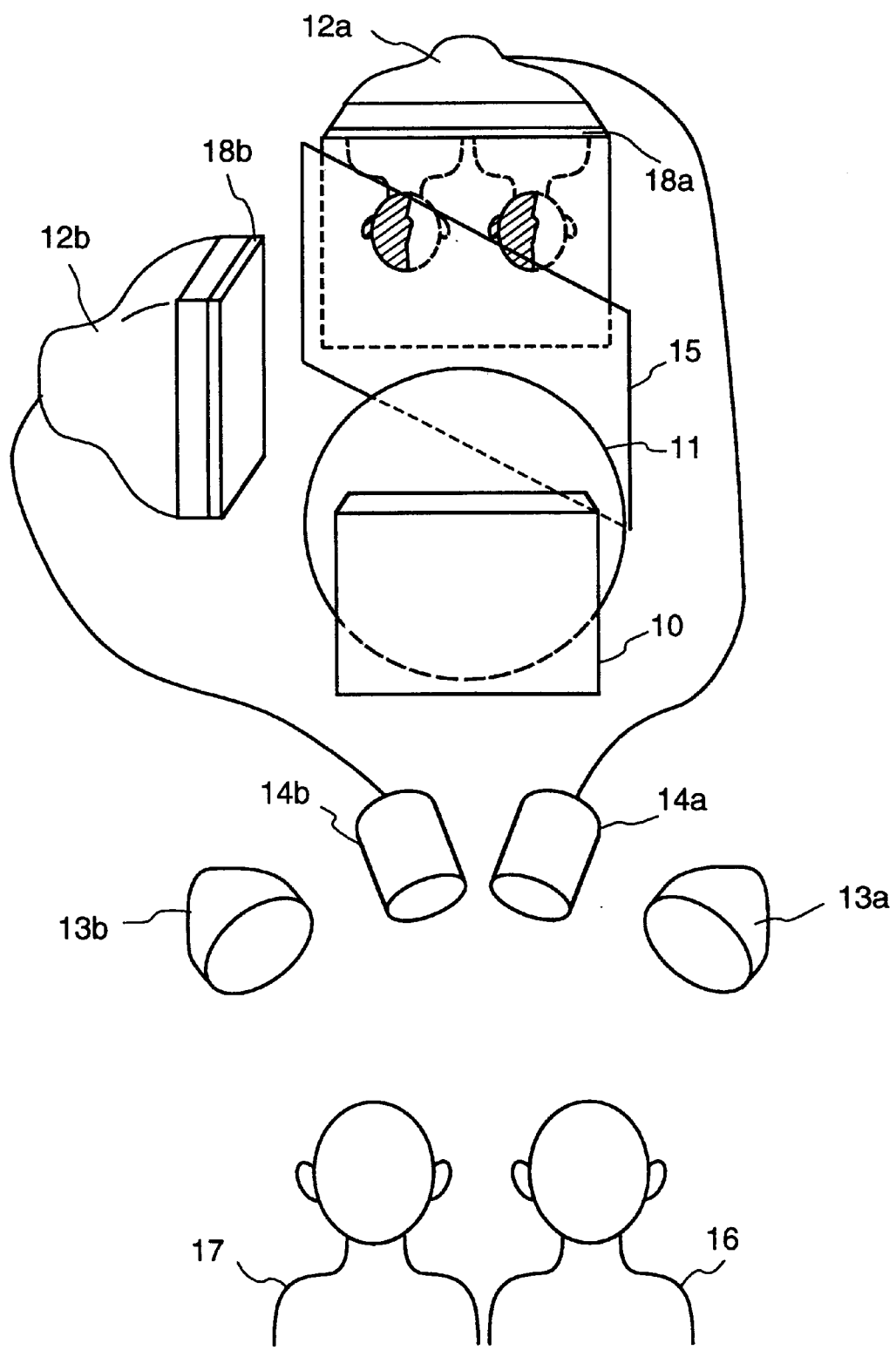
FIG. 3 is a view showing the arrangement of a stereoscopic image display apparatus according to the first embodiment of the present invention.

FIG. 3 illustrates the arrangement of a stereoscopic image display apparatus according to the first embodiment of the present invention.

Referring to FIG. 3, reference numeral 10 denotes a liquid crystal display which displays a pair of target images (i.e., a right-eye target image and a left-eye target image for obtaining a stereoscopic vision). This display 10 employs a transmission-type liquid crystal which transmits light. As will be described later with reference to FIGS. 13 and 14, the display 10 has a property of selectively transmitting two orthogonally polarized light components. Reference numeral 11 denotes a Fresnel lens with a focal length of 150 mm, positioned on the back side of the liquid crystal display 10. Monochrome CRTs 12a and 12b function as light sources in this stereoscopic image display system shown in FIG. 3. The CRTs 12a and 12b are located away from the lens 11 by a distance of, e.g., 160 mm, which is longer than the focal length of the lens 11. Polarizers 18a and 18b are attached to the image display screens of the CRTs 12a and 12b, respectively, and have properties of transmitting orthogonally polarized light components. Reference numerals 13a and 13b denote LED lamps for generating infrared radiations of wavelengths of 850 nm and 950 nm, respectively; 14a and 14b, monochrome CCD cameras; 15, a half mirror for synthesizing images (which serve as back light sources as will be described later) displayed on the CRTs 12a and 12b into one image; and 16 and 17, viewers watching stereoscopic images.

Figure 4:
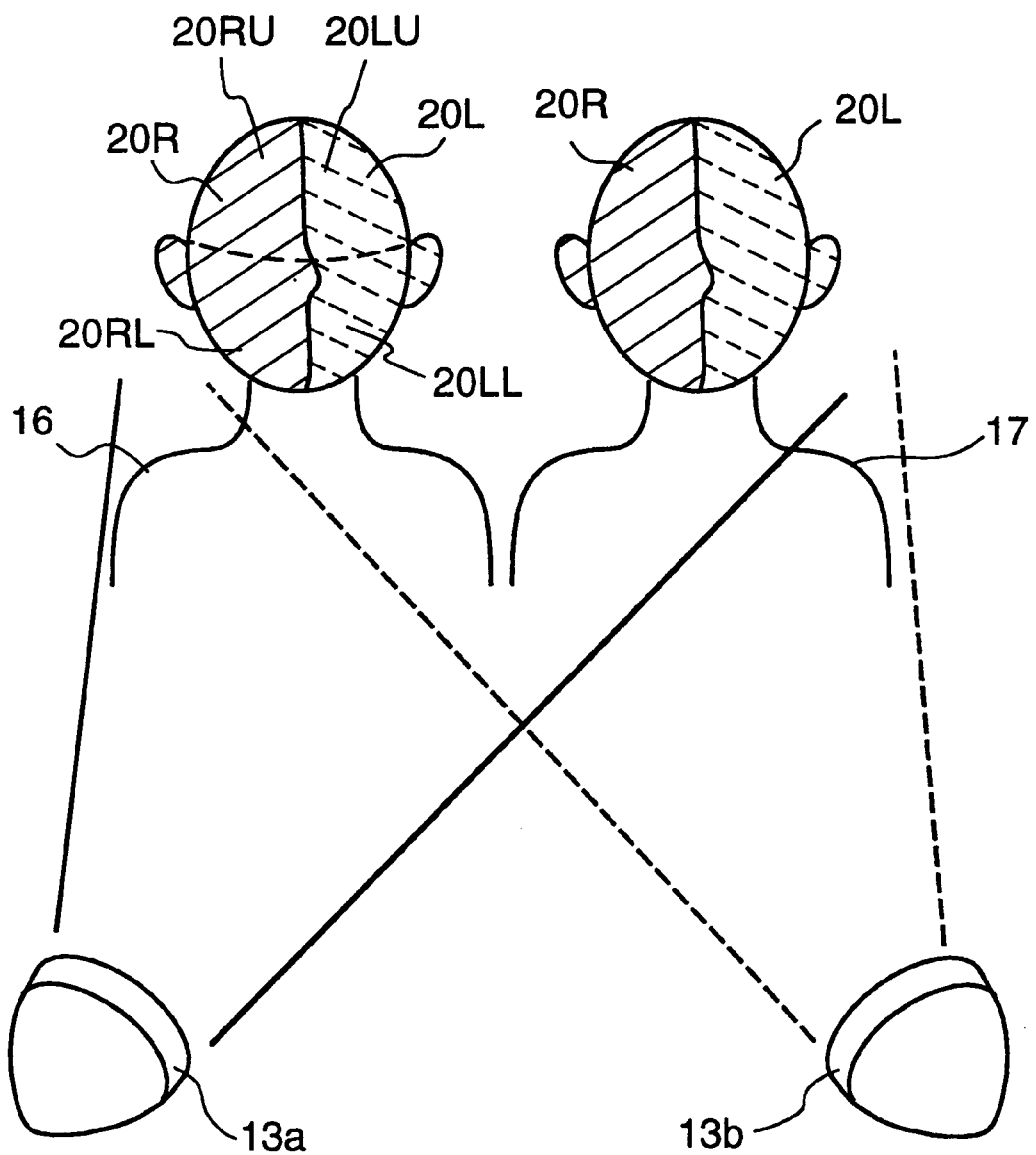
FIG. 4 is a view for explaining the principle of independently generating back light images (graphic patterns) for the right and left eyes in the first and other embodiments of the present invention.

FIG. 4 shows the way the LEDs 13a and 13b emit infrared radiations onto the viewers 16 and 17. In FIG. 4, reference numerals 20a and 20b indicate regions illuminated by the LEDs 13a and 13b, respectively. That is, the right-half portion of the face, 20a, of the viewer is illuminated by the LED 13a, and the left-half portion of the face, 20b, is illuminated by the LED 13b. In FIG. 4 the face of the viewer is divided into four portions for convenience; the upper right portion, 20RU, the lower right portion, 20RL, the upper left portion, 20LU, and the lower left portion, 20LL.

Figure 5:
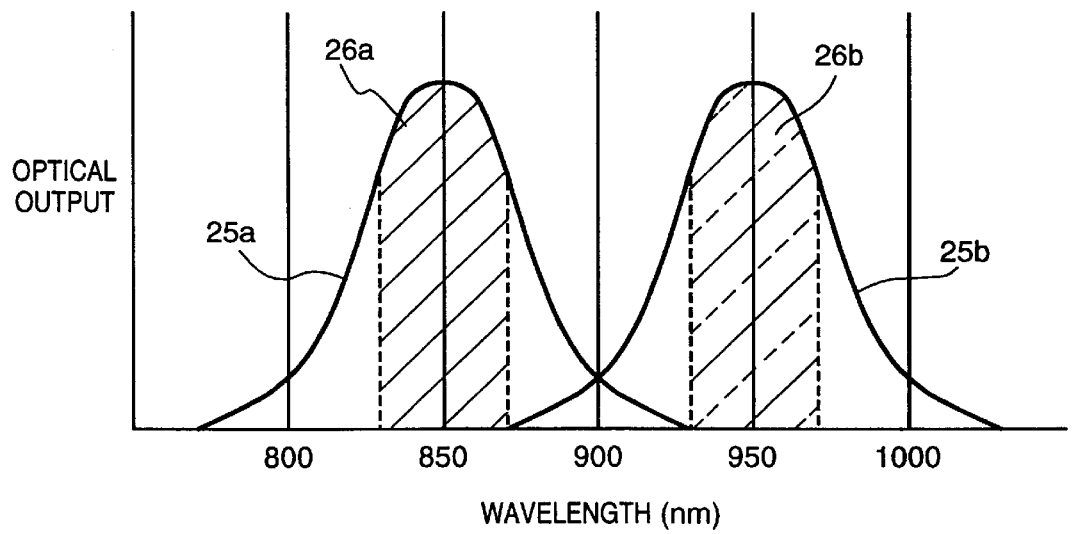
FIG. 5 is a graph showing the emission wavelength distributions of lamps used in the stereoscopic image display apparatuses according to the first and other embodiments of the present invention.

FIG. 5 shows the emission wavelength characteristics of the LEDs 13a and 13b. A characteristic curve 25a represents the wavelength distribution of the LED 13a, and a characteristic curve 25b indicates the wavelength distribution of the LED 13b. Reference numerals 26a and 26b show regions that are selectively transmitted by wavelength filters attached to the monochrome CCD cameras 14a and 14b, respectively.

Figure 6:
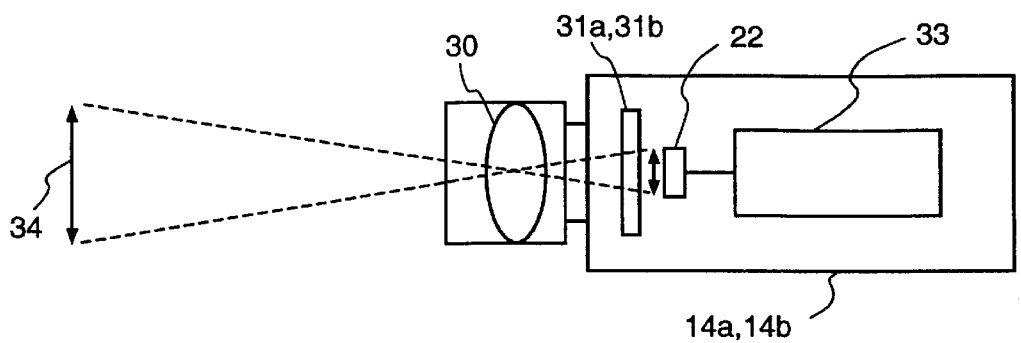
FIG. 6 is a sectional view of an image pickup device (a CCD camera) for use in the stereoscopic image display apparatuses according to the first and other embodiments of the present invention.

FIG. 6 is a sectional view of each of the monochrome CCD cameras 14a and 14b. Referring to FIG. 6, reference 30 denotes a objective lens; 31a or 31b, an interference filter serving as a wavelength filter; 32, an image sensor including a CCD chip; 33, an image sensor drive circuit; and 34, an object to be picked up.

As illustrated in FIG. 4, the LEDs 13a and 13b arranged before the viewers 16 and 17 off to the right and the left are so positioned as to illuminate the right-half region 20a of the face of each of the viewers 16 and 17, and the left-half region 20b of the face of each of the viewers 16 and 17. As in FIG. 5, the luminous wavelengths of the LEDs 13a and 13b have the distributions 25a and 25b having centers at 850 nm and 950 nm, respectively. The light intensities of these LEDs in the overlapped region are lower than their respective half values. Therefore, it is possible to use these LEDs as light sources of two different wavelengths. In the CCD camera 14a (14b), as illustrated in FIG. 6, the interference filter 31a (31b) having transmission characteristics for a wavelength of 850±20 nm (a wavelength of 950±20 nm) is inserted between the image sensor 32 and the objective lens 30. Consequently, only a portion as an object to be picked up remains as an image.

Figure 8A:
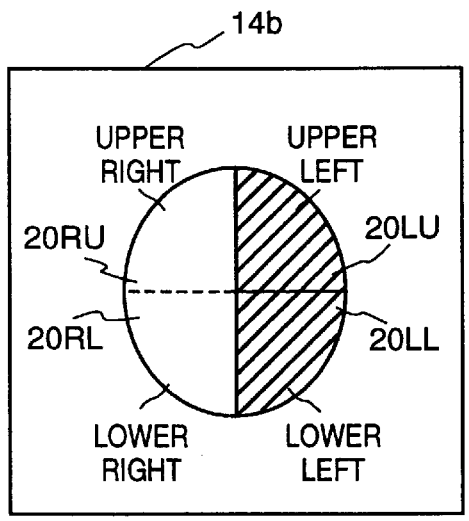
FIG. 8A is a view showing an image of the left-half portion of the face of the viewer picked up by a camera 14*b*.
Figure 8B:
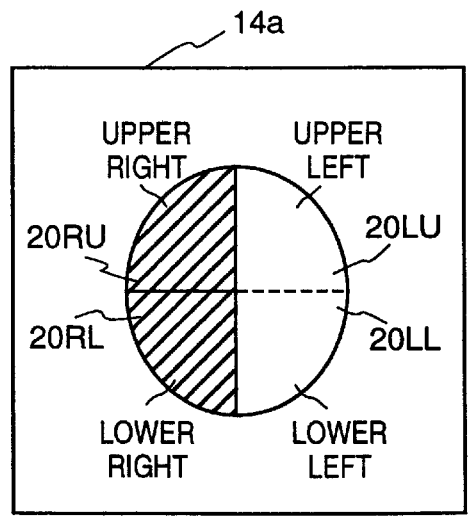
FIG. 8B is a view showing an image of the right-half portion of the face of the viewer picked up by a camera 14*a*.

When the viewers illuminated by the lamps 13a and 13b which emit infrared radiations having the wavelength characteristics 25a and 25b are picked up by the CCD cameras 14a and 14b having the filters 31a and 31b with the transmission characteristics 26a and 26b, respectively, two different images as illustrated in FIGS. 8A and 8B are obtained for one viewer. In FIGS. 8A and 8B, the hatched regions indicate bright regions of the face of the viewer picked up by the cameras 14b and 14a, respectively; that is, in FIG. 8A the hatched portion represents the left-half portion of the face of the viewer illuminated by the lamp 13b, and in FIG. 8B the hatched portion represents the right-half portion of the face of the viewer illuminated by the lamp 13a. Referring to FIGS. 8A and 8B, the right-half face region of the viewer is illustrated on the left side and the left-half face region is on the right side, i.e., the right and left regions of the viewer are inverted in the horizontal direction. This is so because FIGS. 8A and 8B show images obtained by sensing the viewers by using the cameras 14a and 14b placed in front of the viewers.

The system shown in FIG. 3 requires back lights since the display 10 on which target images are displayed uses liquid crystals. An image of the face of the viewer displayed on the light-emitting type CRT 12a (12b) functions as a back light source. In addition, the positional relationship between the CRT 12a (12b), the lens 11, and the viewer is such that the image of the viewer displayed on the CRT 12a (12b) is shown as a virtual image to the eye of the viewer through the lens 11.

Figure 7:
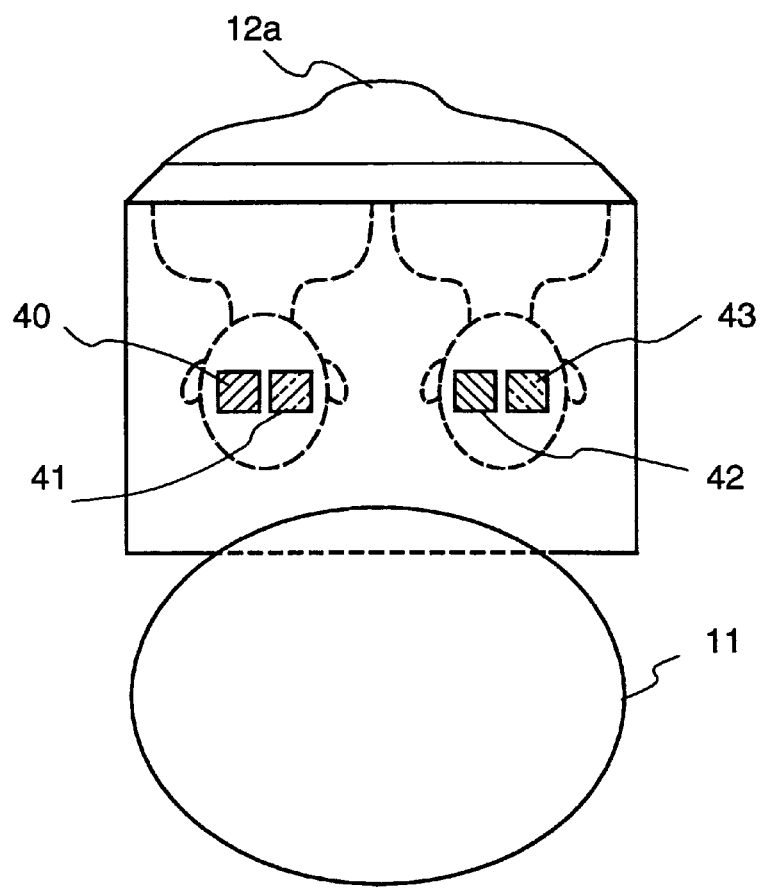
FIG. 7 is a view for explaining the operation of the stereoscopic image display apparatus according to the first embodiment of the present invention.
Figure 7:
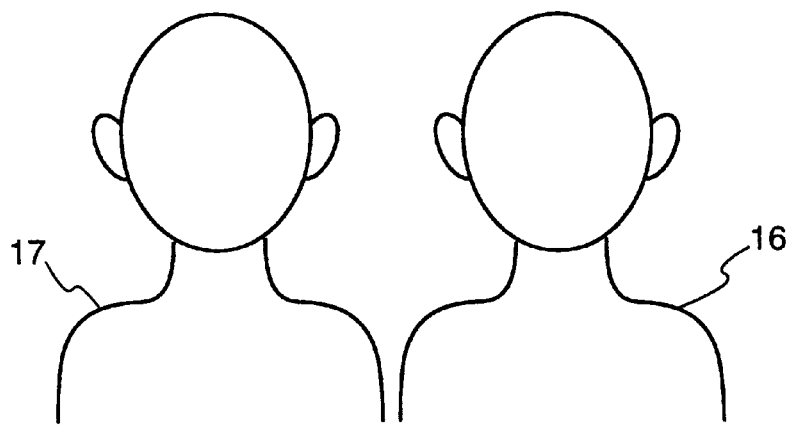

FIG. 7 illustrates the manner the viewer views his or her face image displayed on the CRT 12a as a virtual image in the system shown in FIG. 3. Note that for illustrative convenience, the components such as the CRT 12b and the half mirror 15 are omitted from FIG. 7. In FIG. 7, reference numerals 40, 41, 42, and 43 denote regions that are portions of the viewer displayed on the screen of the monochrome CRT 12a and are actually viewed by the viewer. These regions function as back light sources for the target images displayed on the LCD 10. More specifically, the region 40 (42) functions as a back light source for the right eye of the viewer 16 (17), and the region 41 (43) functions as a back light source for the left eye. As illustrated in FIGS. 8A and 8B, images of the face of the viewer obtained by the cameras 14a and 14b are displayed in such a manner that the right half of the face of the viewer is relatively displayed on the left side and the left half of the face is relatively displayed on the right side. Accordingly, the regions 40, 41, 42, and 43, FIG. 7, correspond to the regions of the face images of the viewers 16 and 17 picked up by the cameras 14a and 14b and displayed on the CRTs 12a and 12b.

Figure 9A:
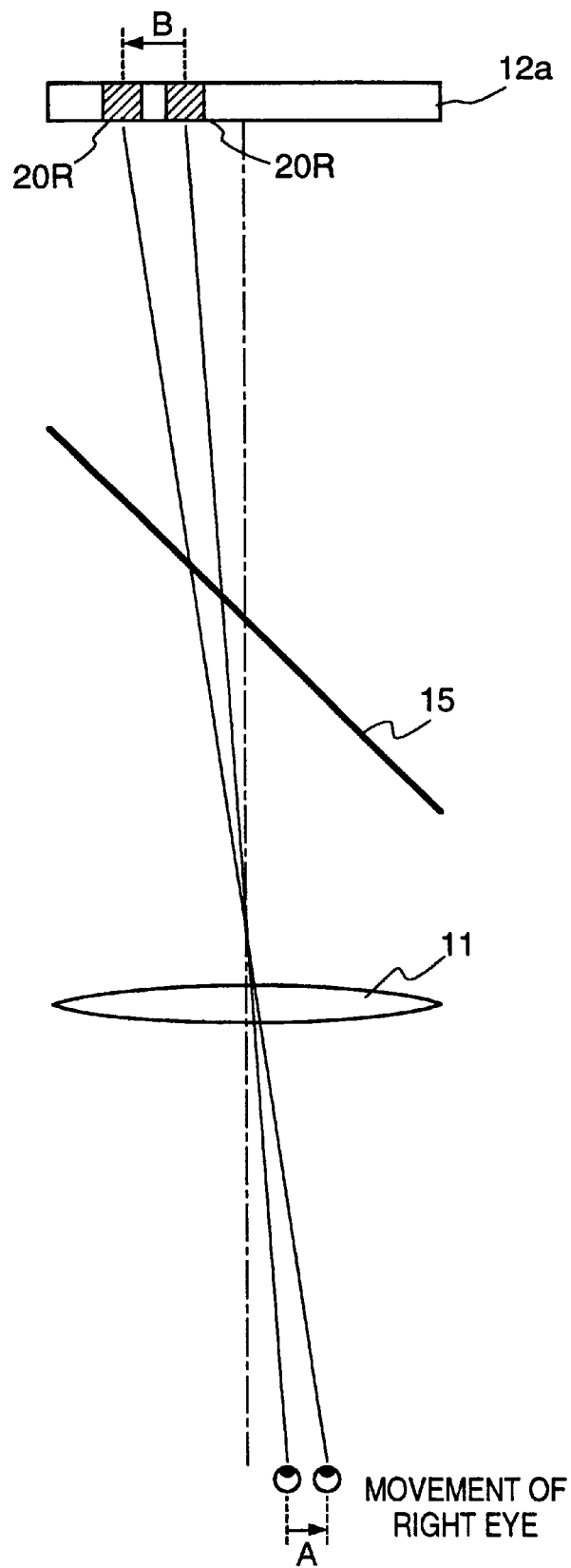
FIG. 9A is a view which shows the process in which a right-eye back light image displayed on a CRT 12*a* reaches the right eye, and explains the way this back-light image follows the right eye of the viewer even if the right eye moves to the right.
Figure 9B:
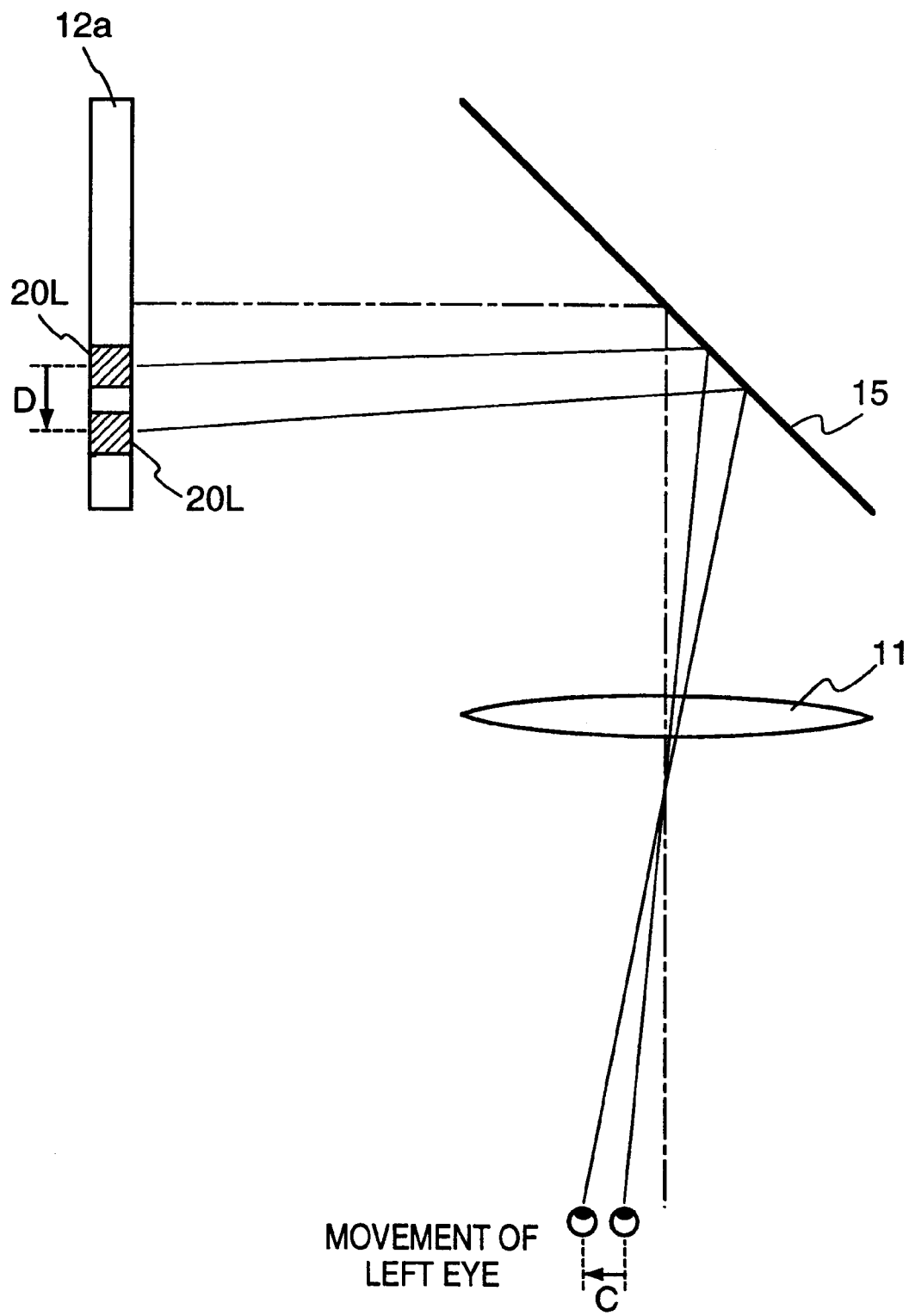
FIG. 9B is a view which shows the process in which a left-eye back light image displayed on a CRT 12*b* reaches the left eye, and explains the way this back light image follows the left eye of the viewer even if the left eye moves to the left.

FIGS. 9A and 9B show the ways the face images displayed on the CRTs 12a and 12b move in accordance with the movements of the right and left eyes, respectively. That is, if the viewer moves to the right, in a direction A, in FIG. 9A, a right-half face image 20R of the viewer displayed on the CRT 12a moves to the left, in a direction B, accordingly. In other words, even if the viewer moves an arbitrary distance to the left (or right), the right-half face image 20R on the CRT 12a moves to the right (or left) on the CRT 12a accordingly. Consequently, the right-half face image 20R keeps serving as the back light source for the right eye.

The back light source for the left eye is reflected by the half mirror 15 and enters the left eye. The half mirror 15 inverts given incident light in the horizontal direction. Therefore, in order for an image 20L of the back light source for the left eye to keep following the movement of the viewer, the image 20L must move in the opposite direction to the image 20R for the right eye. That is, when the viewer moves to the right (or left), the image 20L must move to the right (or left) on the CRT 12b. This is illustrated in FIG. 9B. When the viewer moves to the left, in a direction C, as in FIG. 9B, the left-half face image 20L of the viewer displayed on the CRT 12b needs to be moved in a direction D accordingly. To restate, even if the viewer moves a given distance in the horizontal direction, the left-half face image 20L displayed on the CRT 12b also moves on the CRT 12b accordingly. As a consequence, the left-half face image 20L keeps functioning as the back light source for the left eye.

Figure 10:
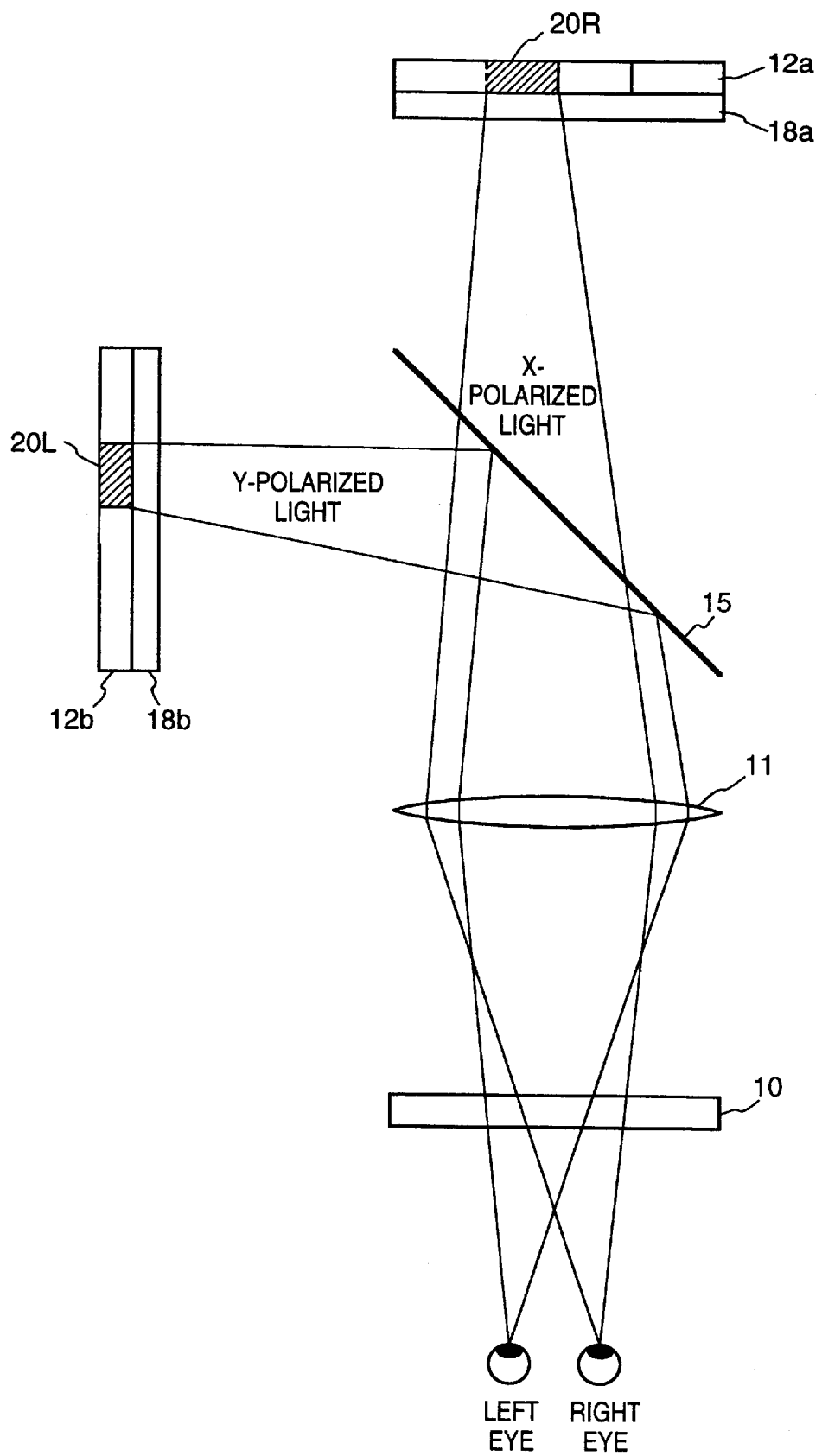
FIG. 10 is a view for explaining the process in which the back light images displayed on the CRTs 12*a* and 12*b* reach the right and left eyes, respectively.

FIG. 10 illustrates the way in which the right-half face image 20R (the left-half face image 20L) displayed on the CRT 12a (12b) enters the right eye (the left eye) through the half mirror 15 and the lens 11.

Figure 9C:
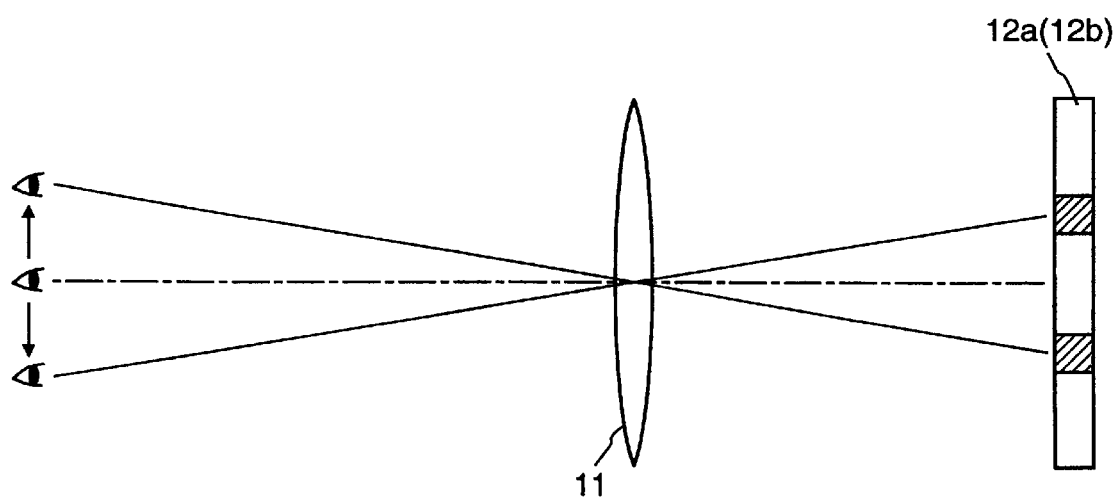
FIG. 9C is a view for explaining the manner a back light image follows the viewer even if the viewer moves upward or downward (in the vertical direction)

FIGS. 9A, 9B, and 10 explain how the images 20R and 20L, as the back light sources, move in accordance with the horizontal movement of the viewer to thereby keep functioning as the back light sources. In the system shown in FIG. 3, the functions of the back light sources are maintained even if the viewer moves vertically. For this purpose, as illustrated in FIG. 9C, the face image of the viewer need only move downward (or upward) on the CRT 12a (or 12b) when the viewer moves upward (or downward). Note that the half mirror 15 has no effect on the vertical movement of the left-half portion of the face of the viewer.

It is understood from the above description that, in order for the right-half face image 20R and the left-half face image 20L to function as the back light sources even when the viewer moves a given distance in the horizontal or vertical direction, it is only necessary to display face images as illustrated in FIGS. 11B and 11A on the CRTs 12a and 12b, respectively. That is, the right-half face image 20R of the viewer picked up by the camera 14a is displayed on the CRT 12a after being inverted in the vertical direction as illustrated in FIG. 11B. This permits the face image 20R to keep serving as the back light source with respect to arbitrary movements of the viewer in the horizontal and vertical directions. Also, as shown in FIG. 11A, the left-half face image 20L of the viewer picked up by the camera 14b is displayed on the CRT 12b after being inverted in both the horizontal and vertical directions. In this case the face image 20L keeps functioning as the back light source with respect to given horizontal and vertical movements of the viewer.

Figure 12A:
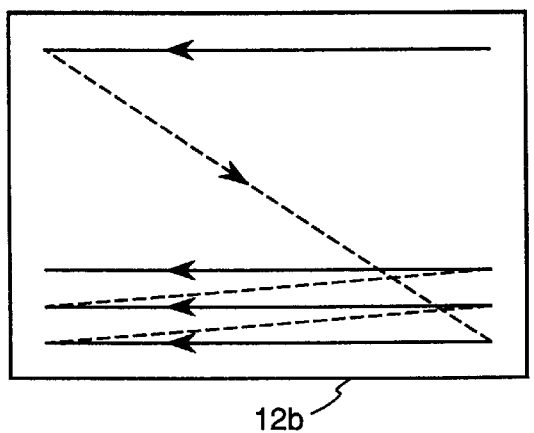
FIG. 12A is a view for explaining the principle of allowing the viewer to view the left-eye back light image which is inverted in the horizontal and vertical directions.
Figure 12B:
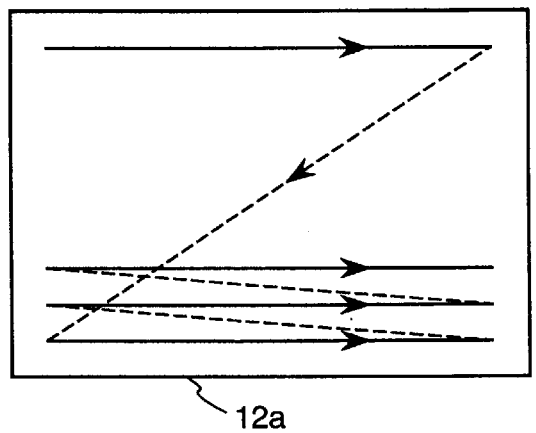
FIG. 12B is a view for explaining the principle of allowing the viewer to view the right-eye back light image which is inverted in the vertical direction.

To display the left-half face image 20L picked up by the camera 14b on the CRT 12b as shown in FIG. 11A, the start point of raster scan of the CRT 12B need only be set at the upper right corner as shown in FIG. 12A. This setting can be accomplished by rotating the screen of the CRT 12b by 180°. On the other hand, to display the right-half face image 20R picked up by the camera 14a on the CRT 12a as illustrated in FIG. 11B, it is only necessary to set the raster scan start point of the CRT 12a at the lower left corner as shown in FIG. 12B.

Note that the settings shown in FIGS. 11A and 11B can naturally be obtained by electronically processing the images. As an example, the setting in FIG. 11A can be attained by inverting the data of the left-half face image picked up by the camera 14b in both the horizontal and vertical directions and displaying the inverted image data on a regular CRT display (a display in which raster scan starts from the upper left corner).

FIG. 13 shows the structure of the liquid crystal display 10 viewed from the CRT display. Reference numeral 50 denotes a liquid crystal panel display screen; and 51, a polarizer attached to the back surface of the liquid crystal panel display screen 50. As in FIG. 13, the display screen 50 of the display 10 consists of a plurality of regions 50a for displaying only a right-eye target image and a plurality of regions 50b for displaying only a left-eye target image. As can be seen from FIG. 13, the regions 50a (and 50b) are display regions that are elongated in the horizontal direction. The display screen 50 is a transmission-type color liquid crystal.

Figure 15:
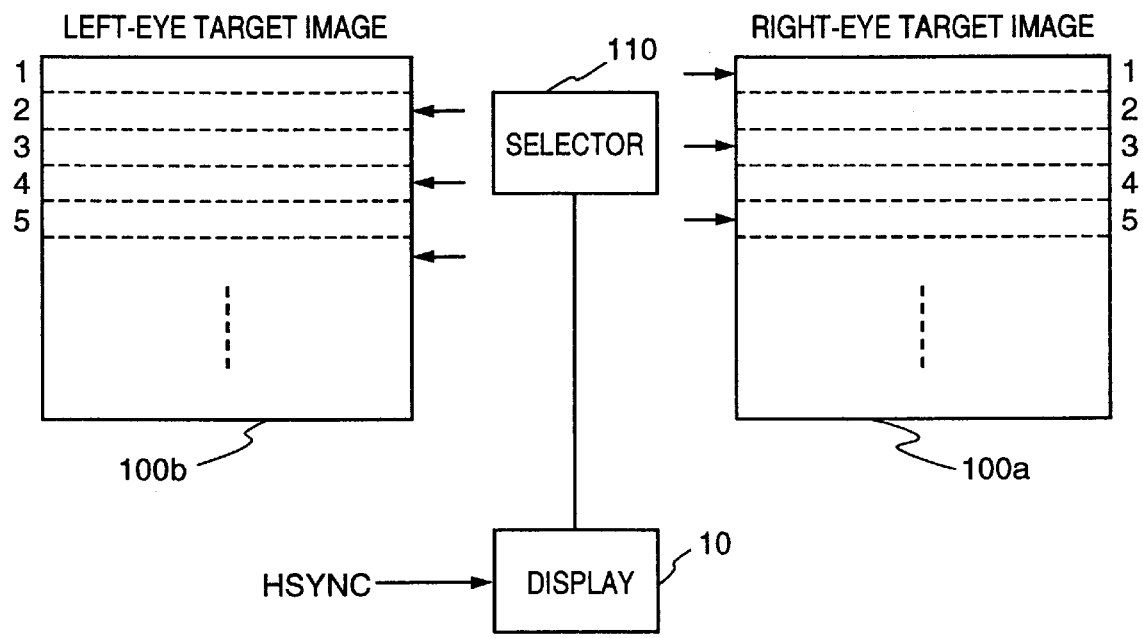
FIG. 15 is a view for explaining the process of generating a right-eye target image and a left-eye target image to be displayed on the display 10.

FIG. 15 explains one example of the method of alternately displaying the right-eye target image and the left-eye target image on the display 10. Referring to FIG. 15, a selector 110 selects image data on odd-numbered lines, starting from the uppermost data, of a memory 100a which stores the right-eye target image, and outputs the selected image data to the display 10. Also, the selector 110 selects image data on even-numbered lines, starting from the uppermost data, of a memory 100b which stores the left-eye target image data, and outputs the selected data to the display 10. Therefore, the selector 110 outputs the image data to the display 10 in the order of the first line of right-eye target image data→ second line of left-eye target image data→ third line of right-eye target image data→ fourth line of left-eye target image data_fifth line of right-eye target image data→ sixth line of left-eye target image data→, . . . , and so on.

As shown in FIG. 13, the polarizer 51 consists of a plurality of regions 51a and a plurality of regions 51b both of which are elongated in the horizontal direction. The regions 51a are polarizing portions having a property of transmitting polarized light in the direction indicated by an arrow 52a in FIG. 13. The regions 51b are polarizing portions having a property of transmitting polarized light in the direction indicated by an arrow 52b which is perpendicular to the arrow 52a. For convenience, the direction of the arrow 52a will be called an X direction, and the direction of the arrow 52b will be called a Y direction.

Figure 14:
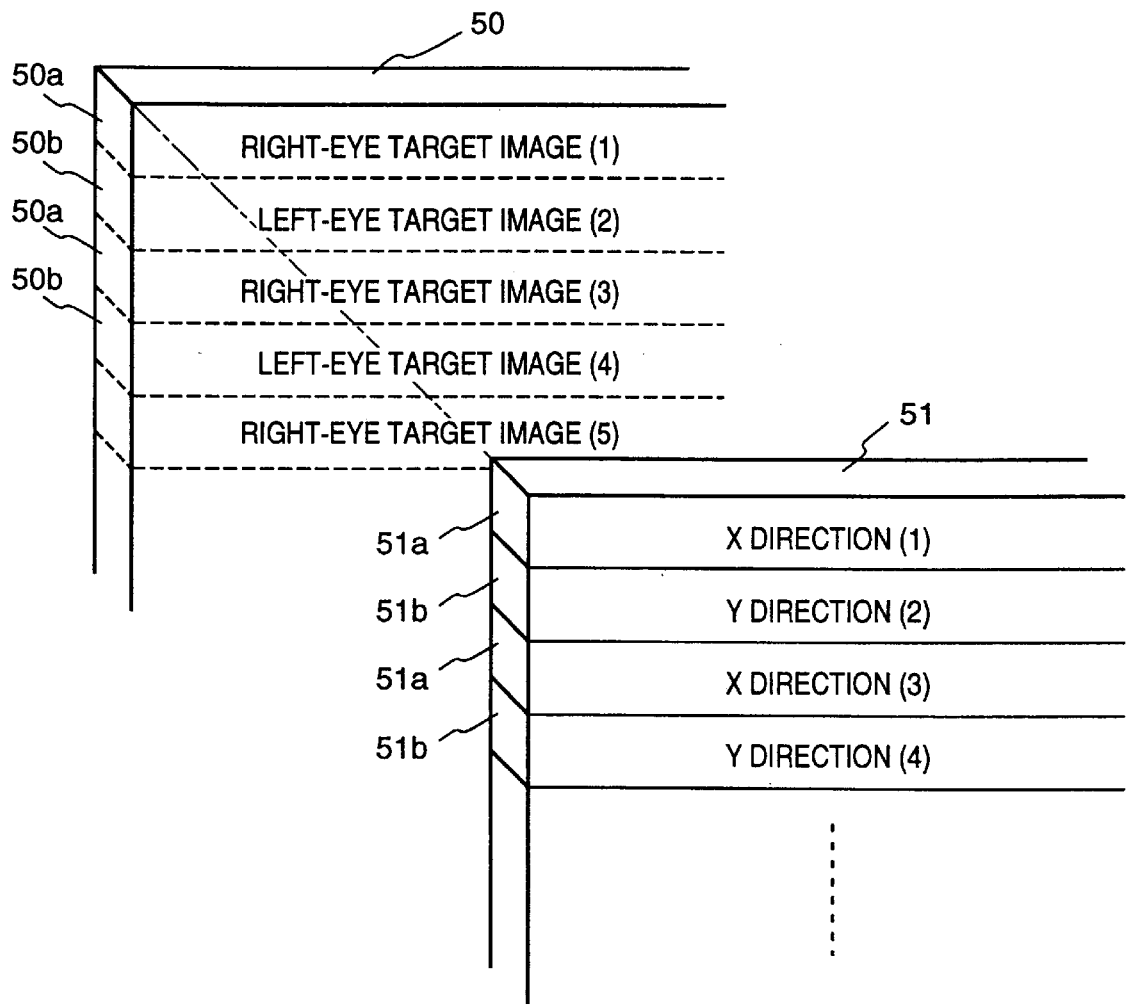
FIG. 14 is a view for explaining the positional relationship between a display screen 50 and a polarizing element 51 in the display 10 of FIG. 13.

FIG. 14 shows the correspondence between the regions 50a and 50b on the display screen 50 and the regions 51a and 51b on the polarizer 51. The vertical dimension of each of the regions 50a and 50b on the display screen 50 equals that of each of the regions 51a and 51b on the polarizer 51. In the arrangement shown in FIG. 14, the vertical dimensions of the regions 50a and 50b and those of the regions 51a and 51b are the same. Consequently, as shown in FIG. 14, the region 50a which displays the first line of the right-eye target image corresponds to the region 51a, which has the X-polarized light transmission characteristic, on the first line of the polarizer 51. The region 50b which displays the second line of the left-eye target image corresponds to the region 51b, which has the Y-polarized light transmission characteristic, on the second line of the polarizer 51. The region 50a which displays the third line of the right-eye target image corresponds to the region 51a, which has the X-polarized light transmission characteristic, on the third line of the polarizer 51. The region 50b which displays the fourth line of the left-eye target image corresponds to the region 51b, which has the Y-polarized light transmission characteristic, on the fourth line of the polarizer 51.

Referring back to FIG. 10, the polarizers 18a and 18b are attached to the display screens of the CRTs 12a and 12b, respectively. Of the light emitted from the CRT 12a, the polarizer 18a transmits only polarized light in a particular direction (the same X direction as the arrow 52a in FIG. 13). On the other hand, the polarizer 18b transmits only polarized light in the direction (Y direction) perpendicular to the polarizing direction of the polarized light transmitted by the polarizer 18a. Assume, for convenience, that the polarizer 18a transmits only the X-polarized light and the polarizer 18b transmits only the Y-polarized light. Consequently, in FIG. 10 the X-polarized light and the Y-polarized light alone enter the display 10 through the half mirror 15.

Figure 16A:
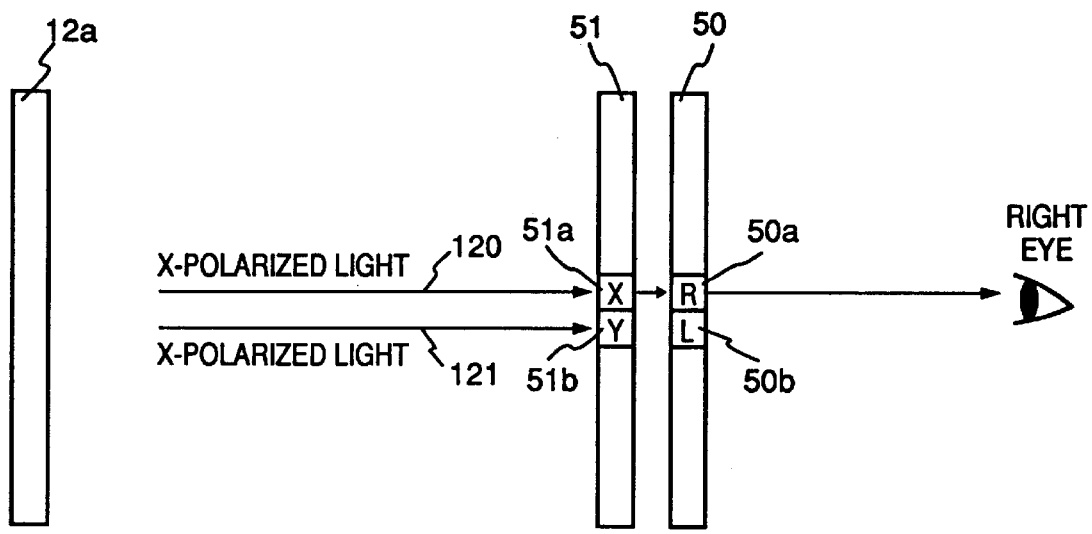
FIG. 16A is a view for explaining the process in which only the right-eye target image of the right- and left-eye target images displayed on the display 10 reaches the right eye.
Figure 16B:
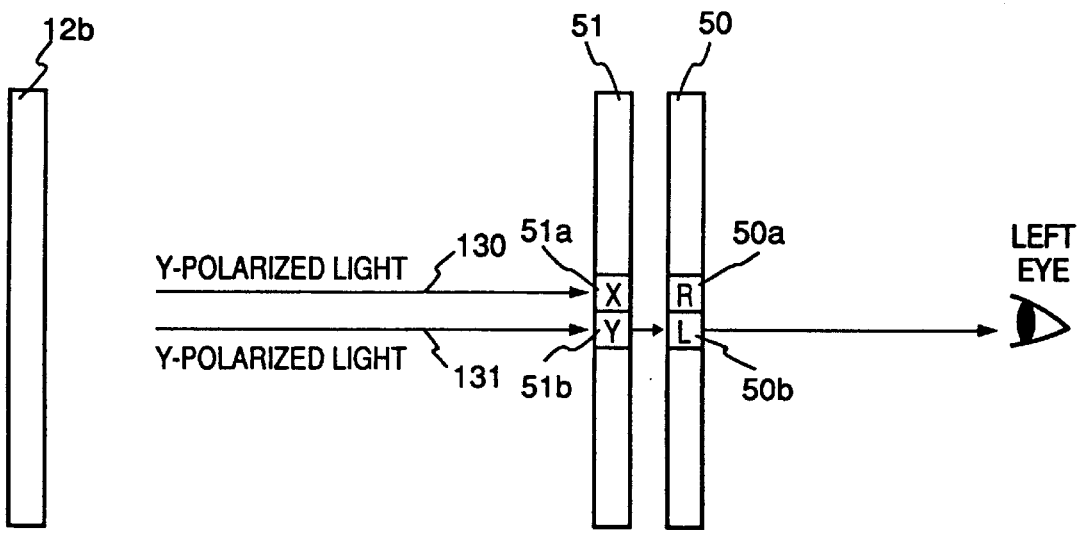
FIG. 16B is a view for explaining the process in which only the left-eye target image of the right- and left-eye target images displayed on the display 10 reaches the left eye.

FIG. 16A explains the way the right-eye target image alone enters the right eye of the viewer, and FIG. 16B explains the way the left-eye target image alone enters the left eye of the viewer.

Although the light transmitted through the half mirror 15 contains both the X-polarized light and the Y-polarized light, illustration of the Y-polarized light is omitted from FIG. 16A since, as illustrated in FIG. 10, the Y-polarized light which serves as back light from the CRT 12b does not enter the right eye. Assume that in FIG. 16A, two X-polarized light beams 120 and 121 irradiated from the display 12a are incident on the region 51a which has the property of transmitting only X-polarized light and on the region 51b which has the property of transmitting only Y-polarized light, respectively. Assume also that image data which allows transmission of light corresponds to the regions 50a and 50b. In this situation, the X-polarized light beam 120 is transmitted through the region 51a, and then is transmitted through the region 50a which displays right eye image. In other words, the region 50a is back lighted. However, the X-polarized light beam 121 cannot transmit through the region 51b which has the property of transmitting only Y-polarized light. Therefore, the region 50b which displays the left eye image is not back lighted. Accordingly, the right eye of the viewer sees only the right eye image displayed on the region 50a.

FIG. 16B explains the way the left-eye target image alone enters the left eye of the viewer. Although the light transmitted through the half mirror 15 contains both the X-polarized light and the Y-polarized light, illustration of the X-polarized light is omitted from FIG. 16B since, as illustrated in FIG. 10, the X-polarized light which serves as back light from the CRT 12a does not enter the left eye.

Assume that in FIG. 16B, two Y-polarized light beams 130 and 131 irradiated from the display 12b are incident on the region 51a which has the property of transmitting only X-polarized light and on the region 51b which has the property of transmitting only Y-polarized light, respectively. Assume also that image data for right and left eyes which allows transmission of light corresponds to the regions 50a and 50b, respectively. The Y-polarized light beam 131 is transmitted through the region 51b, and then is transmitted through the region 50b which displays the left eye image. In other words, the region 50b is back lighted. However, the Y-polarized light beam 130 cannot transmit through the region 51a which has the property of transmitting only X-polarized light. Therefore, the region 50a which displays the right eye image is not back lighted. Accordingly, The left eye of the viewer sees only the left eye image displayed on the region 50b.

The action of the Fresnel lens 11 will be described below with reference to FIG. 7. The Fresnel lens 11 is so arranged that the viewers 16 and 17 can watch the images of the viewers displayed on the monochrome CRTs 12a and 12b as virtual images. In this case the distances to the CRTs 12a and 12b are set to be larger than the focal length of the Fresnel lens 11. This allows the right and left eyes of the viewer 16 to independently view only the face image 20R (or 20L) displayed on the screen of the CRT 12a (or 12b) in an enlarged scale which is limited to the effective diameter of the Fresnel lens 11. Consequently, the Fresnel lens 11 can make the region 20R act as a light source for the viewer, which is of a size equivalent to the effective diameter of the Fresnel lens 11 and has selectivity to the right eye. Since the region 20L does not emit light at that time, no light from the CRT 12a enters the left eye. This action of the Fresnel lens 11 also applies to the CRT 12b; the light from the CRT 12b enters only the left eye. Therefore, by causing the right-half regions 20a of the faces of the viewers 16 and 17, FIG. 4, displayed on the monochrome CRT 12a to correspond to the regions 40 and 42, FIG. 7, the viewers 16 and 17 watch bright virtual images only with their right eyes. Likewise, by causing the left-half face regions 20b, FIG. 4, displayed on the monochrome CRT 12b to correspond to the regions 41 and 43, FIG. 7, the viewers 16 and 17 watch bright virtual images only with their left eyes.

Note that the luminance and the contrast of each of the CRTs 12a and 12b and the lens apertures of the CCD cameras 14a and 14b are so adjusted that the face regions 20a and 20b are displayed in white with a high luminance. Note also that the LEDs used as the illuminating devices need only have the ability to radiate wavelengths in the infrared region. For example, it is possible to use a halogen lamp whose radiation wavelength band is limited by a wavelength filter.

Although a Fresnel lens is used in the first embodiment, a convex lens or a concave mirror can also be used since it is only necessary to achieve the enlarging action. In addition, in the first embodiment a pair of monochrome CRTs equipped with polarizing filters are used as the back light graphic pattern display devices. However, it is also possible to use a pair of liquid crystal displays in which the polarizing direction of a polarizing filter on the image output side is made agree with the polarized light transmission characteristic of the spatial modulation device.

The display 10 is so designed as to display the right-eye target image and the left-eye target image by finely dividing these images in the horizontal direction. However, these target images can also be finely divided in the vertical direction. The point is that the regions for independently displaying the right-eye target image and the left-eye target image need only correspond to the regions 51a and the regions 51b of the polarizer so that these target images can be selectively seen by the right and left eyes. Note, however, that the degree of the fine division of the display 10 is determined so as not to degrade the resolution.

With the operation described above of the apparatus of this embodiment, the right-eye target image displayed in the display portions 50a of the liquid crystal display 10, FIG. 13, is so illuminated from the back side as to be viewable only by the right eyes of the viewers 16 and 17. Analogously, the left-eye target image displayed in the display portions 50b of the liquid crystal display 10 is so illuminated from the back side as to be viewable only by the left eyes of the viewers 16 and 17. Consequently, the viewers 16 and 17 can watch the pair of target images at the same time, i.e., both viewers can see a stereoscopic vision. Even if the viewers 16 and 17 move, this stereoscopic vision can be obtained provided that the illumination conditions of the LED, FIG. 4, are maintained.

Second Embodiment

Figure 17:
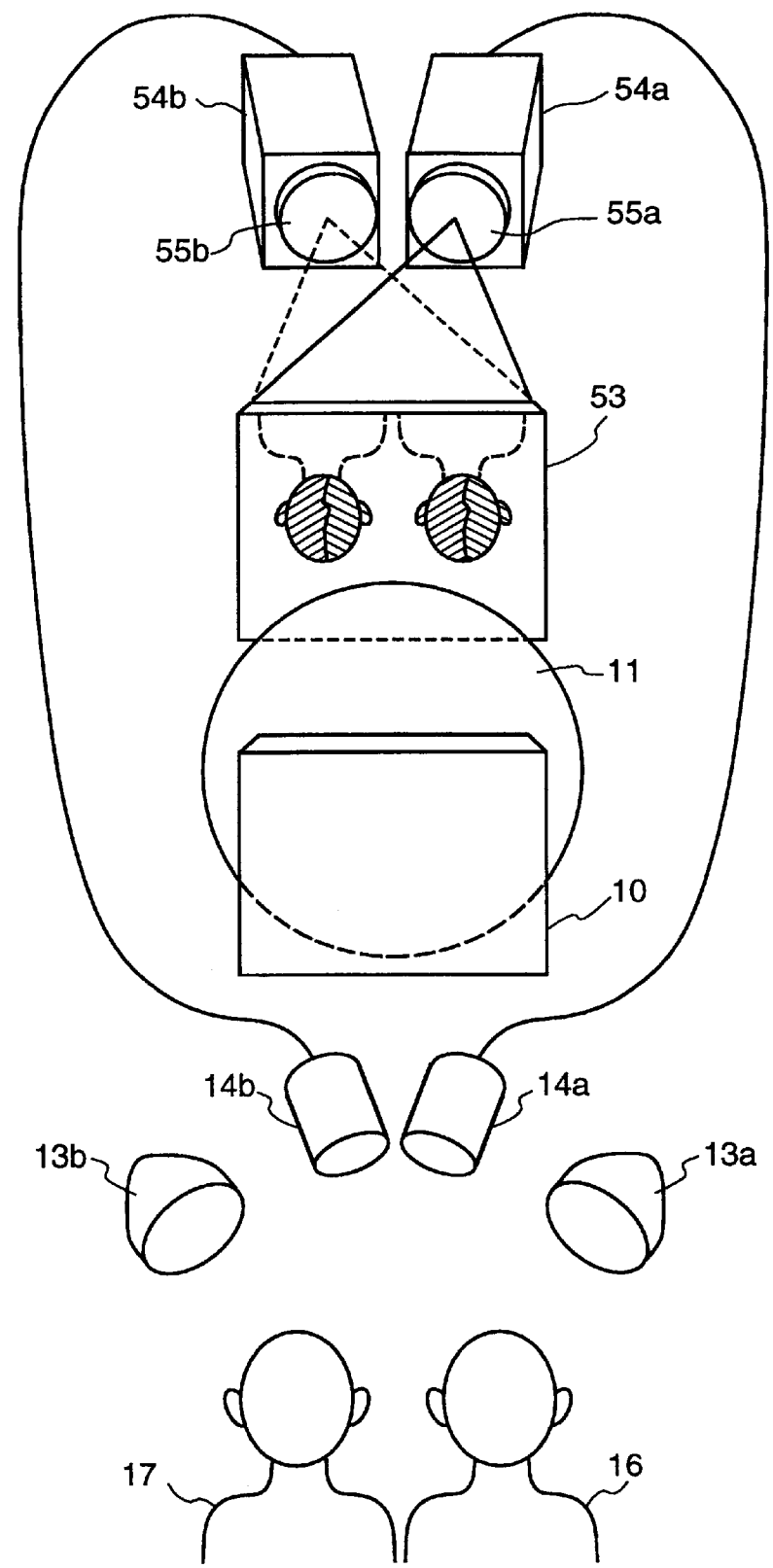
FIG. 17 is a view showing the arrangement of a stereoscopic image display apparatus according to the second embodiment of the present invention.

FIG. 17 illustrates the arrangement of a stereoscopic image display apparatus according to the second embodiment of the present invention. In the first embodiment described above, the right-eye back light image and the left-eye back light image respectively displayed on the CRT 12a and the CRT 12b are synthesized by the half mirror 15. The characteristic feature of this second embodiment is that these images are synthesized by a screen 53.

In FIG. 17, reference numeral 10 denotes a transmission-type liquid crystal display (with the arrangement shown in FIG. 13) similar to the display used in the first embodiment. As in FIG. 13, this display 10 can simultaneously display right- and left-eye target images in different regions 50a and 50b. Reference numeral 11 denotes a Fresnel lens which is positioned on the back side of the liquid crystal display 10 and has a focal length of 150 mm. Reference numerals 54a and 54b denote projection display devices having a light-emitting function; and 53, a transmission screen onto which output images from the projection display devices 54a and 54b are projected. The screen 53 is located away from the lens 11 by 160 mm which is longer than the focal length of the lens 11. Polarizers 55a and 55b are attached to the front surfaces of the projection display devices 54a and 54b, respectively, and have properties of transmitting orthogonally polarized light components. That is, the polarizer 55a (55b) attached to the display device 54a (54b) of the second embodiment has the same polarized light transmission characteristic as that of the polarizer 18a (18b) attached to the CRT display 12a (12b) of the first embodiment. Reference numerals 13a and 13b denote LED lamps having wavelengths of 850 nm and 950 nm, respectively; and 14a and 14b, monochrome CCD cameras as image pickup devices. Image outputs from the cameras 14a and 14b are connected to the projection display devices 54a and 54b, respectively. Reference numerals 16 and 17 denote viewers watching stereoscopic images.

The LEDs 13a and 13b and the cameras 14a and 14b in the second embodiment have the same arrangements as those of the respective counterparts in the first embodiment. Therefore, the camera 14a outputs an image of the right-half portion of the face of each viewer, and the camera 14b outputs an image of the left-half portion of the face of each viewer. The right-half face images of the viewers 16 and 17 picked up by the monochrome CCD camera 14a are displayed, as back light graphic patterns corresponding to the right eyes of the viewers, on the screen 53 by the projection display device 54a. In this case the images displayed on the screen 53 are given specific linearly polarized light (X-polarized light in this embodiment) by the polarizer 55a. By making this polarizing direction X agree with a transmission polarizing direction 52a which regions 51a of the polarizer 51 of the liquid crystal display 10 have with respect to the right-eye target image, the image corresponding to the back light graphic pattern is transmitted through the liquid crystal display 10. As a result, the right eye of the viewer can recognize the right-eye back light graphic pattern displayed on the display device 54a, as the back light of the liquid crystal display 10, which is a virtual image enlarged by the lens 11. At that time, the left-eye target image displayed in the regions 50b of the liquid crystal display 10 has transmission polarizing direction 52b which is orthogonal to the direction 52a. Therefore, the right-eye back light graphic pattern does not pass through the left-eye target image display portion of the liquid crystal display 10, so the right eye of the viewer cannot see the left-eye target image. Similarly, the left-half face images (the left-eye back light graphic patterns corresponding to the left eyes of the viewers) of the viewers 16 and 17 picked up by the monochrome CCD camera 14b and displayed on the screen 53 by the projection display device 54b are polarized in the specific polarizing direction by the polarizer 55b and transmitted through the liquid crystal display 10. This permits the left eye of the viewer to see only this left-eye target image.

Note that in the second embodiment, the left-eye back light graphic pattern is not inverted in the horizontal direction, since the half mirror 15 of the first embodiment is not employed. Therefore, the display devices 54a and 54b display image data of the face images of the viewers which are picked up by the cameras 14a and 14b after the data are electronically inverted in the vertical direction. In other words, unlike in the first embodiment it is not necessary to horizontally invert the left-eye back light graphic pattern for the display 54b.

Third Embodiment

Figure 18:
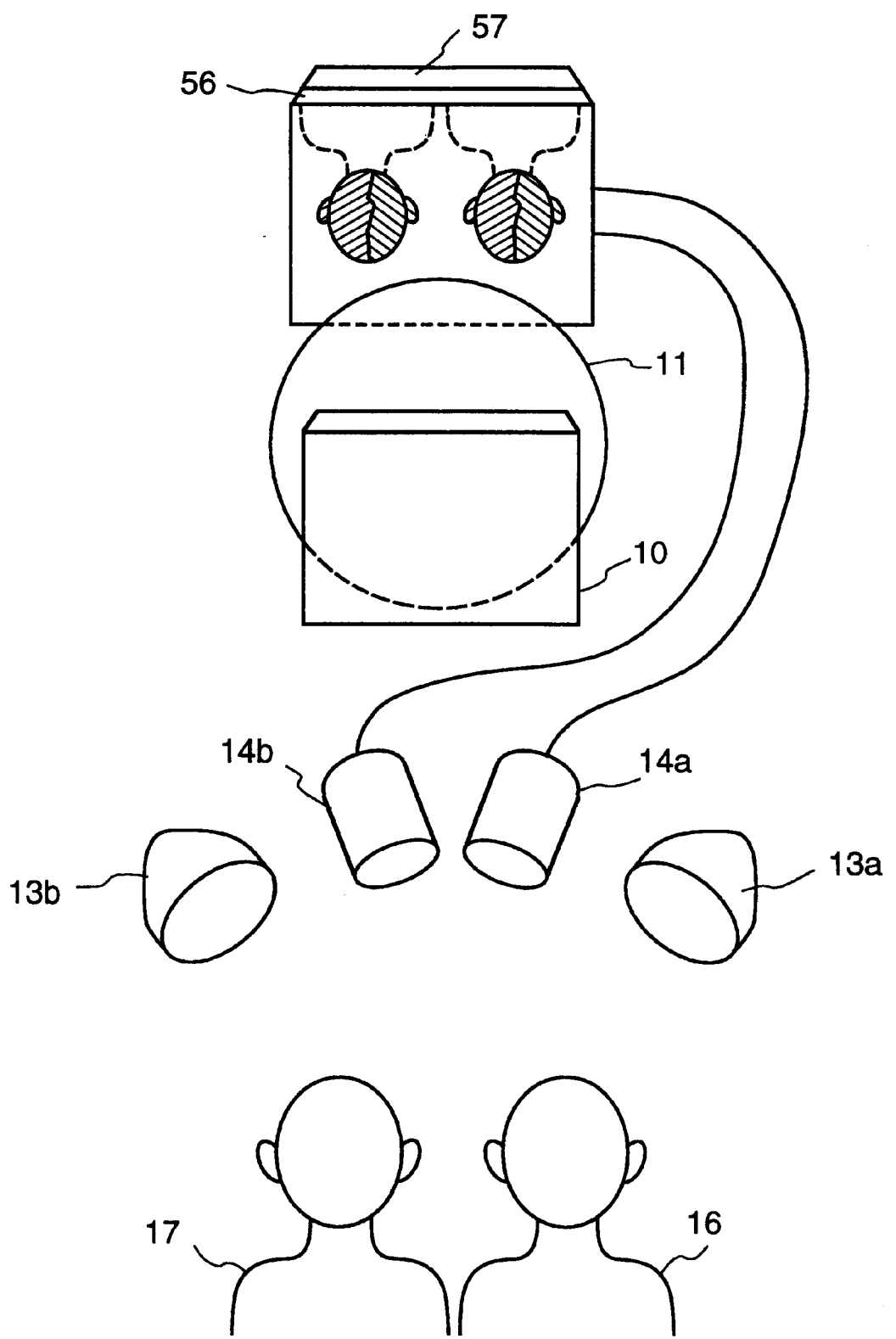
FIG. 18 is a view showing the arrangement of a stereoscopic image display apparatus according to the third embodiment of the present invention.

FIG. 18 shows the arrangement of a stereoscopic image display apparatus according to the third embodiment of the present invention.

In FIG. 18, a transmission liquid crystal display 10 similar to those in the first and second embodiments simultaneously displays right- and left-eye target images. Reference numeral 11 denotes a Fresnel lens positioned on the back side of the liquid crystal display 10 and having a focal length of 150 mm; and 56, a monochrome liquid crystal display having a light-emitting function. This display 56 has the same structure and function as those of the liquid crystal display 10 (FIG. 13) of the first embodiment. A high-luminance back light device 57 is attached to the rear surface of the display 56. The monochrome liquid crystal display 56 is located away from the lens 11 by 160 mm which is longer than the focal length of the lens 11.

Reference numerals 13a and 13b denote LED lamps having wavelengths of 850 nm and 950 nm, respectively; and 14a and 14b, monochrome CCD cameras as image pickup devices. Image outputs from the cameras 14a and 14b are connected together to the monochrome liquid crystal display 56. Reference numerals 16 and 17 denote viewers watching stereoscopic images.

An image of the right-half portion of the face of each viewer picked up by the monochrome CCD camera 14a is displayed as a right-eye back light graphic pattern, which corresponds to the right eye of the viewer, in display portions 50a, FIG. 13, of the liquid crystal display 56. Likewise, an image of the left-half portion of the face of each viewer picked up by the monochrome CCD camera 14b is displayed as a left-eye back light graphic pattern, which corresponds to the left eye of the viewer, in display portions 50b, FIG. 13, of the display 56.

Figure 19:
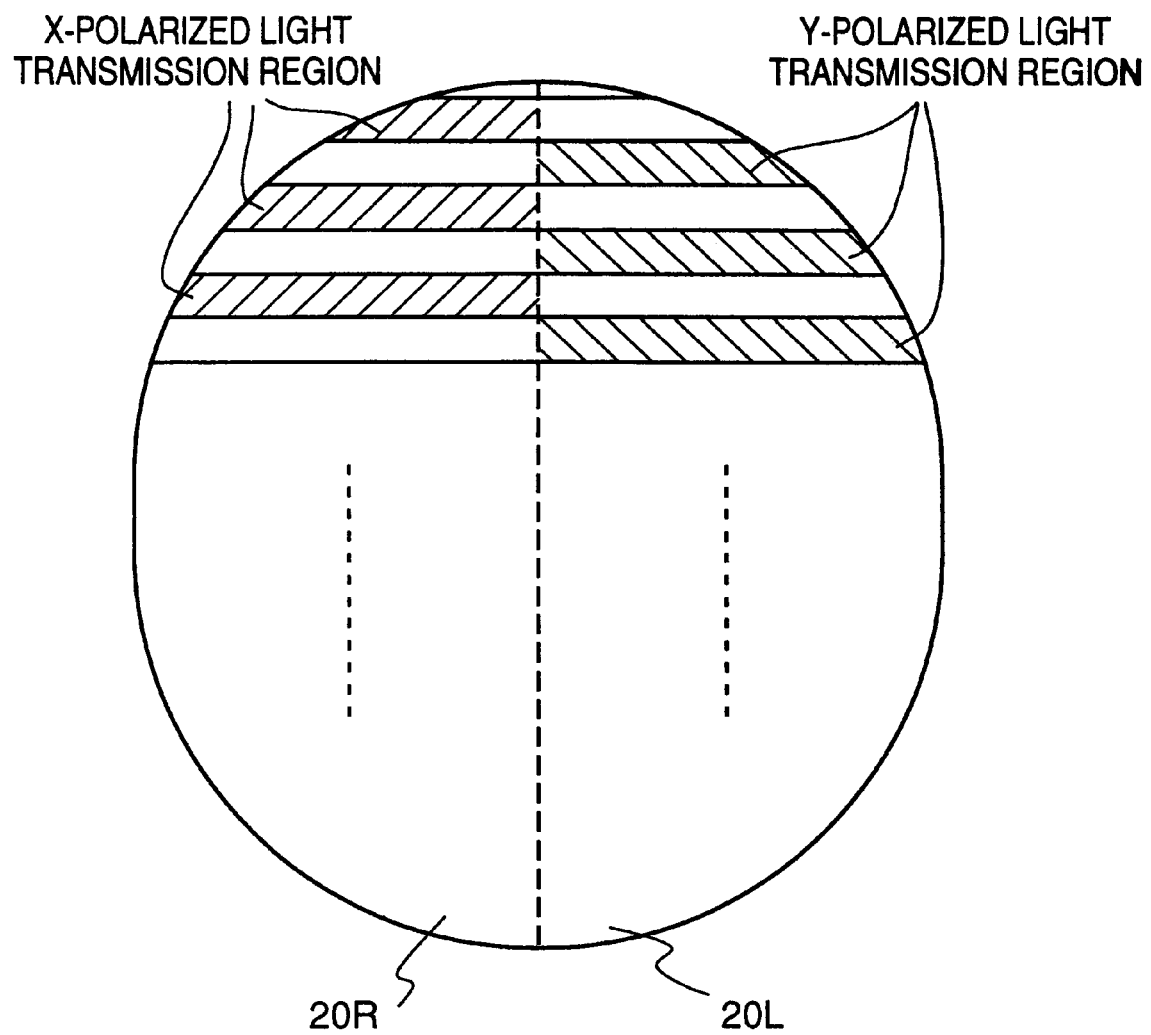
FIG. 19 is a view for explaining the principle of generating back light graphic patterns in the third embodiment of the present invention.

Consequently, as illustrated in FIG. 19, an output image from the display 56 is such that both the right-eye back light graphic pattern and the left-eye back light graphic pattern are finely divided into strips and light-emitting portions alternately appear in these strips of the two patterns. Referring to FIG. 19, a plurality of strip-like bands in a right-half face image 20R transmit only X-polarized light, and a plurality of strip-like bands in a left-half face image 20L transmit only Y-polarized light.

Note that in this third embodiment, the back light graphic patterns are formed into a band-like shape, as shown in FIG. 19. However, since the Fresnel lens 11 changes these band-like images into a virtual image, the viewer is not aware of the band-like portions. In the third embodiment, therefore, the right-eye back light graphic pattern and the left-eye back light graphic pattern are incident on the display 10 under the same conditions as in the first embodiment. Consequently, in much the same way as in the first embodiment, the right-eye target image enters the right eye, and the left-eye target image enters the left eye. In addition, in this third embodiment only one device is necessary to display the back light graphic patterns and the target images, and no half mirror is required.

Fourth Embodiment

FIG. 20 shows the arrangement of a stereoscopic image display apparatus according to the fourth embodiment of the present invention.

In FIG. 20, reference numeral 10 denotes a transmission liquid crystal display identical with those used in the first to third embodiments; 11, a Fresnel lens arranged on the back side of the liquid crystal display 10 and having a focal length of 150 mm; and 12a and 12b, monochrome CRTs for displaying back light graphic patterns. The CRTs 12a and 12b are located away from the lens 11 by 160 mm which is longer than the focal length of the lens 11. Polarizers 18a and 18b are attached to the image display screens of the monochrome CRTs 12a and 12b, respectively, and have properties of transmitting orthogonal polarized light components. Reference numerals 16 and 17 denote viewers watching stereoscopic images; and 27a and 27b, ultrasonic irradiation devices. The ultrasonic irradiation devices 27a and 27b irradiate ultrasonic waves having frequencies 100 kHz and 120 kHz, respectively, onto the viewers 16 and 17. Ultrasonic sensors 28a and 28b sense reflected waves of the ultrasonic waves irradiated by the ultrasonic irradiation devices. These ultrasonic sensors 28a and 28b selectively sense only the frequencies irradiated by the ultrasonic irradiation devices 27a and 27b, respectively. Reference numeral 29 denotes an image output device; and 45a and 45b, graphic patterns which represent portions corresponding to the right-half faces of the viewers displayed on the monochrome CRT 12a.

The ultrasonic waves of two different wavelengths irradiated by the ultrasonic irradiation devices 27a and 27b are reflected by the viewers 16 and 17 and sensed by the ultrasonic sensors 28a and 28b, respectively. From the sensed signals, the image output device 29 calculates the position coordinates corresponding to the right- and left-half faces of the viewers. The image output device 29 then displays the right-eye back light graphic pattern corresponding to the right eye of the viewer and the left-eye back light graphic pattern corresponding to the left eye of the viewer, each of which has a predetermined shape, at positions on the display screens of the monochrome CRTs 12a and 12b which correspond to the sensed face positions of the viewers.

In the fourth embodiment, the image output device 29 can process and display the two back light images described above such that portions except for those corresponding to the faces of the viewers are not displayed at all. In the first to third embodiments, even in the right-eye (or the left-eye) back light graphic pattern a region which functions as an undesired back light may partially exist in a region corresponding to the left eye (or the right eye) due to the influence of external light. This inconvenient back light produces crosstalk between the right- and left-eye target images, by which the right-eye (left-eye) image is slightly recognized by the left (right) eye. However, in the fourth embodiment the back light graphic patterns having a predetermined shape are generated at a position corresponding to the position of the face of the viewer. This eliminates the crosstalk.

Note that the viewer position detection method of the fourth embodiment which uses the ultrasonic irradiation devices, the ultrasonic sensors, and the image output device is, of course, applicable to the second and third embodiments in which the operation of the stereoscopic image display apparatus is basically identical with that of the fourth embodiment.

Fifth Embodiment

Figure 21A:
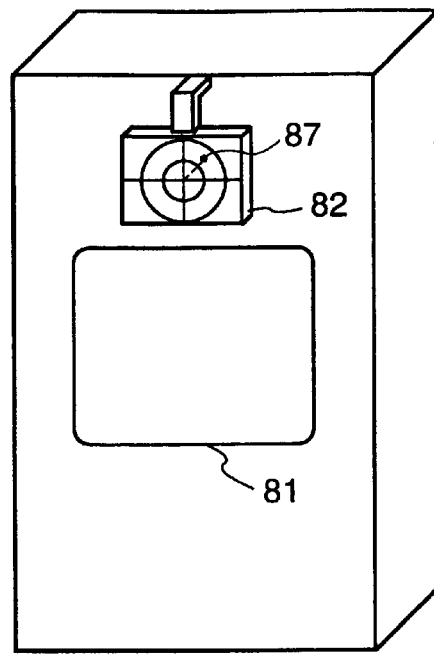
FIG. 21A is a perspective view showing the arrangement of a stereoscopic image display apparatus according to the fifth embodiment of the present invention.
Figure 21B:
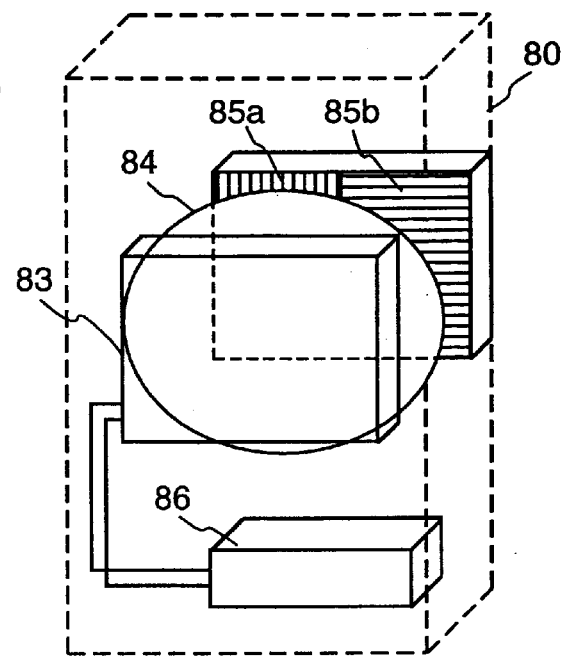
FIG. 21B is a perspective view showing the interior of the stereoscopic image display apparatus according to the fifth embodiment of the present invention.

FIG. 21A shows the outer appearance of an image display apparatus according to the fifth embodiment of the present invention. FIG. 21B shows the internal arrangement of the fifth embodiment. In this fifth embodiment back light graphic patterns are displayed at a fixed position. Therefore, the apparatus of the fifth embodiment cannot flexibly provide a stereoscopic vision following the movement of the viewer, but can be manufactured at a low cost. Since the back light display position is fixed, the position of the viewer is limited, and consequently an indicating device for searching for the best suited position of the viewer is required.

In FIG. 21A, reference numeral 80 denotes a case which covers the entire apparatus; 81, a view window through which target images are viewed; and 82, a sighting device as an indicating device for indicating to the viewer a position at which the viewer can stereoscopically view the target images. In FIG. 21B, reference numeral 83 denotes a transmission liquid crystal display; 84, a Fresnel lens which is located on the back side of the liquid crystal display 83 and has a focal length of 150 mm; and 85, a planar light-emitting device plate (e.g., a fluorescent screen an IF, or a plasma display). The light-emitting device plate 85 has two light-emitting regions 85a and 85b divided with respect to the center on a surface, which have properties of transmitting orthogonal polarized light components. The light-emitting device plate 85 is located away from the lens 84 by 160 mm which is longer than the focal length of the lens 84. An image output device 86 outputs the target images to the liquid crystal display 83.

Figure 22:
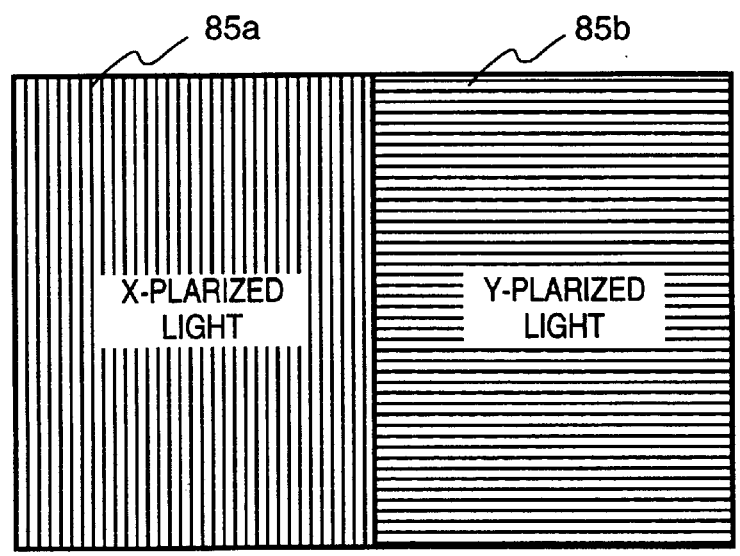
FIG. 22 is a view showing the arrangement of a back light device in the fifth embodiment of the present invention.

As illustrated in FIG. 22, in the right-half region 85b and the left-half region 85a separated from the center of the surface, the planar light-emitting device plate 85 has two polarizing filters having properties of transmitting orthogonal polarized light components. The light-emitting device plate 85 has an internal light-emitting device and thereby emits light from the entire surface. Consequently, the left-half region 85a emits only X-polarized light, and the right-half region 85b emits only Y-polarized light. The left-half region 85a is the back light graphic pattern corresponding to the right eye of the viewer through the Fresnel lens 84. The right-half region 85b is the back light graphic pattern corresponding to the left eye of the viewer.

In order for these right- and left-eye back light graphic patterns to correctly act on the right and left eyes of the viewer, the position at which the viewer stands must be strictly limited. If the viewer stands at another position, the right and left eyes of the viewer see the same target image (only the right- or left-eye target image), so no stereoscopic vision is accomplished. The sighting device 82 can indicate to the viewer a right position at which the viewer should stand. That is, the sighting device 82 which is transparent and has concentric circles and a target mark 87 formed on the surface of the case 80 are so arranged that a stereoscopic vision is possible when the viewer puts his or her face at a position at which the target mark 87 overlaps the central point of the sighting device 82. With this arrangement, the viewer can readily know the position at which a stereoscopic vision is established.

Sixth Embodiment

Figure 23:
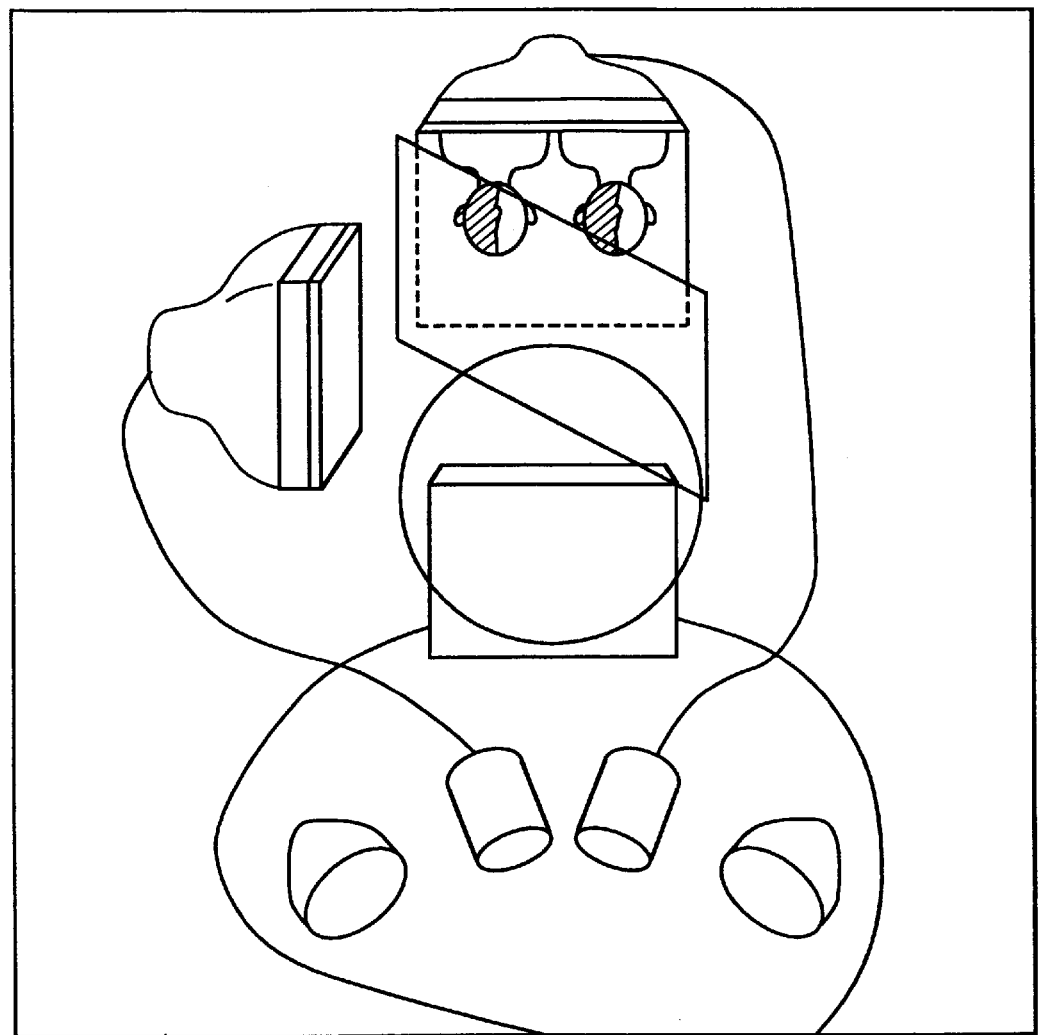
FIG. 23 is a view showing the arrangement of a stereoscopic image display apparatus according to the sixth embodiment of the present invention.
Figure 23:
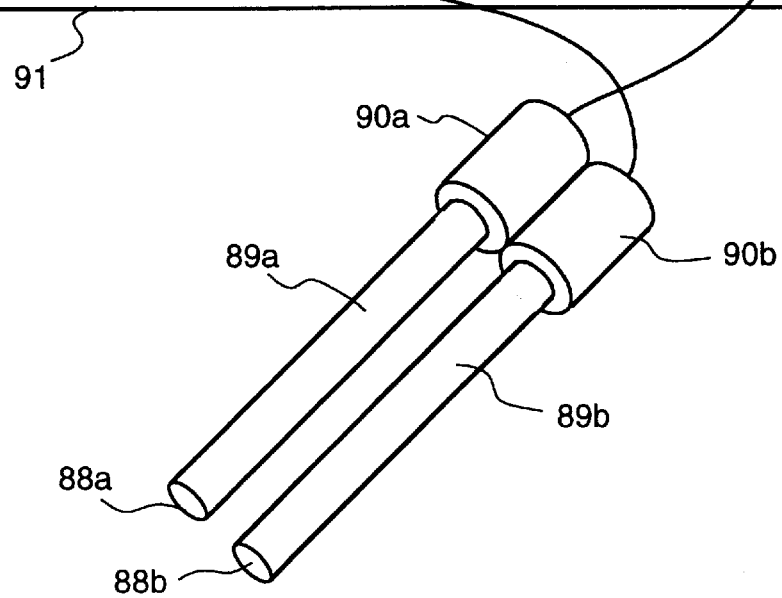

FIG. 23 illustrates the arrangement according to the sixth embodiment of the present invention, by which an image picked up by an endoscope is stereoscopically viewed. Reference numerals 88a and 88b denote objective lenses for image-sensing an object to be picked up; and 89a and 89b, lens barrels for guiding the picked up image, each of which incorporates an optical system. The lens barrels 89a and 89b are arranged at an angle corresponding to the convergence angle of the eyes of the viewer. Reference numerals 90a and 90b denote CCD cameras; and 91, a stereoscopic image display apparatus according to the first embodiment of the present invention previously described with reference to FIG. 3.

The operation of the endoscope with the above arrangement will be described below. Two images of the object picked up by the objective lenses 88a and 88b are formed as the right- and left-eye target images by the CCD cameras 90a and 90b through the lens barrels 89a and 89b having the convergence angle for obtaining a stereoscopic vision. In this manner the endoscope functions as a stereoscopic endoscope. The two images thus formed are applied to a liquid crystal display 10 of the stereoscopic image display apparatus 91, where the images are displayed as a pair of target images. With the function of the stereoscopic image display apparatus 91 explained in the first embodiment of the present invention, a large number of viewers can watch the images picked up by this stereoscopic endoscope.

Note that the image sensors 90a and 90b according to the present invention can also be arranged adjacent to the objective lenses 88a and 88b, so that images of an object to be picked up are guided through the lens barrels 89a and 89b after being converted into electrical signals by these image sensors. In this case the shape of the lens barrels can be chosen from any arbitrary shape, resulting in a more effective arrangement for the object of the present invention.

Note also that the stereoscopic image display apparatus 91 used in the sixth embodiment can, of course, be any of the stereoscopic image display apparatuses of the second to fifth embodiments of the present invention.

Seventh Embodiment

Figure 24:
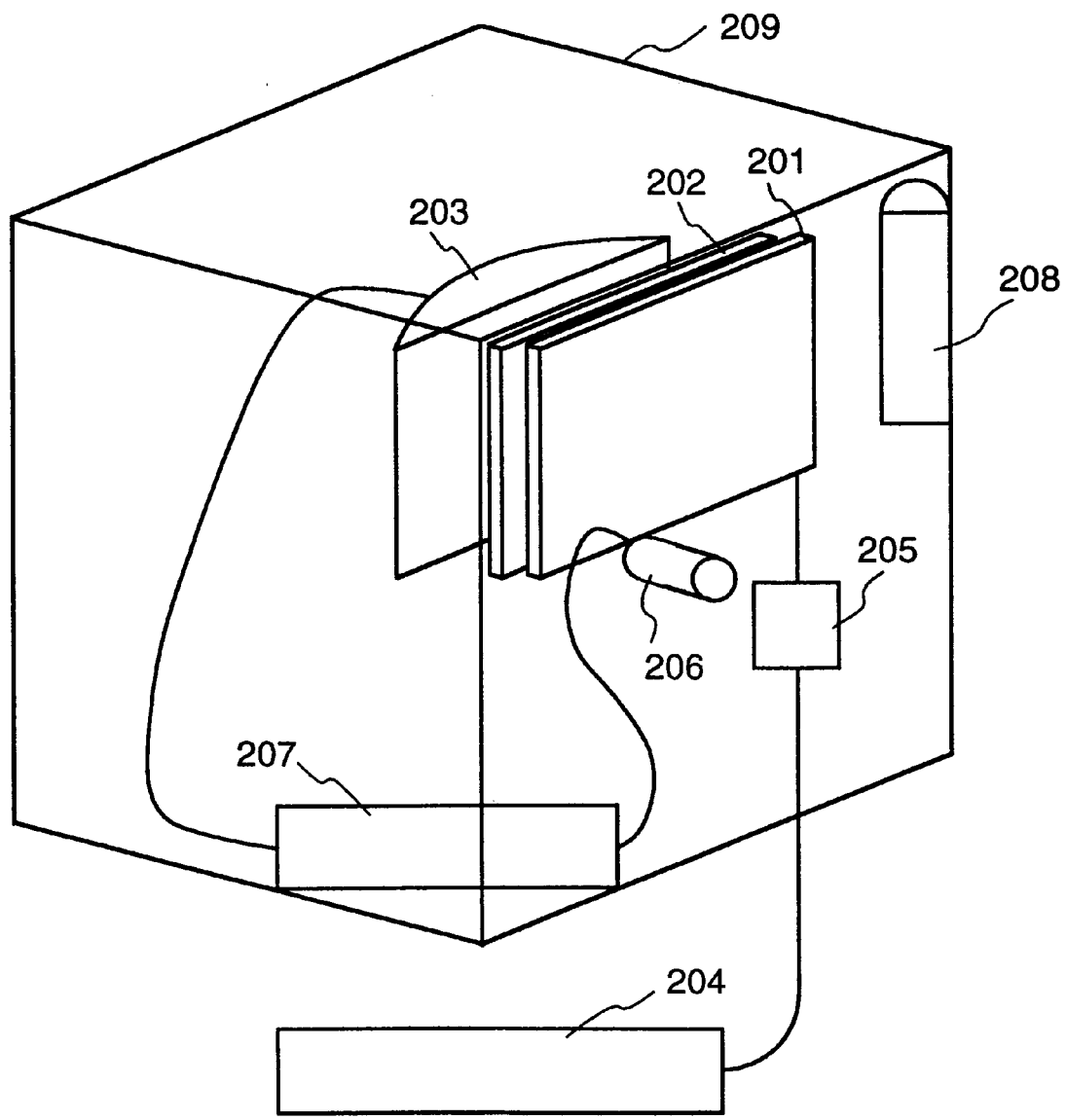
FIG. 24 is a view showing the arrangement of a stereoscopic image display apparatus according to the seventh embodiment of the present invention.

In each of the first to sixth embodiments described above, the right- and left-eye back light images (graphic patterns) are generated by two sets of illuminating devices or cameras, and target images are displayed on a monochrome liquid crystal display. FIG. 24 is a perspective view showing the arrangement of a stereoscopic image display apparatus according to the seventh embodiment of the present invention. In this seventh embodiment, the right- and left-eye back light images (graphic patterns) are generated by one set of a camera and an illuminating device, and target images are displayed on a color liquid crystal display.

Referring to FIG. 24, a transmission color liquid crystal display 201 simultaneously displays the right-and the left-eye target images. More specifically, as in the display 10 of the first embodiment, in the display 201 the display screen is divided into a plurality of rectangular regions each having a strip-like shape. Strip-like right-eye target images and strip-like left-eye target images are alternately displayed parallel to each other in every other rectangular regions. As with the display 10 in the first embodiment, two different types of polarizers having properties of transmitting orthogonal polarized light components are attached to the front surface of the display 201. Reference numeral 202 denotes a Fresnel convex lens positioned on the back side of the color liquid crystal display 201 and having a focal length of 150 mm; and 203, a monochrome liquid crystal television display serving as a back light device. The television display 203 is located away from the Fresnel convex lens 202 by 160 mm which is larger than the focal length of the Fresnel convex lens 202. Reference numeral 204 denotes a target image output device such as a video tape recorder; and 205, a matrix circuit for processing the output stereo video signal from the image output device 204. The matrix circuit 205 outputs the signal such that the color liquid crystal display 201 displays two target images parallel in time on the same screen. Reference numeral 206 denotes an infrared television camera for image-sensing an image of the face of the viewer watching a stereoscopic image; 207, an image processor for processing the face image picked up by the television camera 206; 208, an infrared lamp for illuminating the right-half portion of the face of the viewer; and 209, a case for accommodating the major components of the system.

In this embodiment, the monochrome liquid crystal television display 203 is a general liquid crystal television display from the surface of which a polarizer provided as an analyzer is removed.

In a general monochrome liquid crystal television display, ordinary light incident as back light from the behind is polarized by a polarizer having horizontally paralyzing properties. This polarized light is guided to pass through the liquid crystal molecules having properties of vertically rotating the polarizing axis more largely as the density of the displayed image is lower. The light passing through the liquid crystal molecules is guided to pass through an analyzer (a polarizer having a polarizing axis in the vertical direction) before being output. Consequently, a liquid crystal molecule portion where the density of the displayed image is high does not transmit the back light, since the polarizing axis is not rotated vertically. On the other hand, a portion (a bright portion) where the density is lower transmits a larger amount of the back light. In this way a common liquid crystal television display can display the gradation of an image.

The monochrome liquid crystal television display 203 of this embodiment, however, which is not equipped with the analyzer described above, transmits both an image portion where the image density is high and an image portion where the image density is low with the same luminance. Consequently, the television display 203 acts as a light-emitting device which emits two light components different only in the direction of the polarizing axis. That is, upon receiving binary ("0" and "1") image data, the liquid crystal television display 203 of the seventh embodiment generates light linearly polarized in a predetermined direction (called an X direction hereinafter) for one binary image data and light linearly polarized in a direction (called a Y direction hereinafter for convenience) perpendicular to the predetermined direction described above for the other binary image data.

Figure 25:
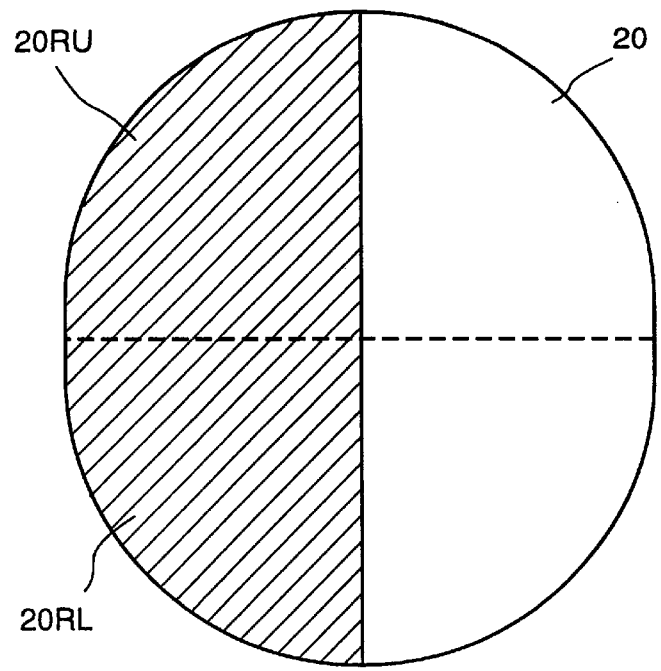
FIG. 25 is a view for explaining the principle of generating back light graphic patterns in the seventh embodiment.
Figure 26:
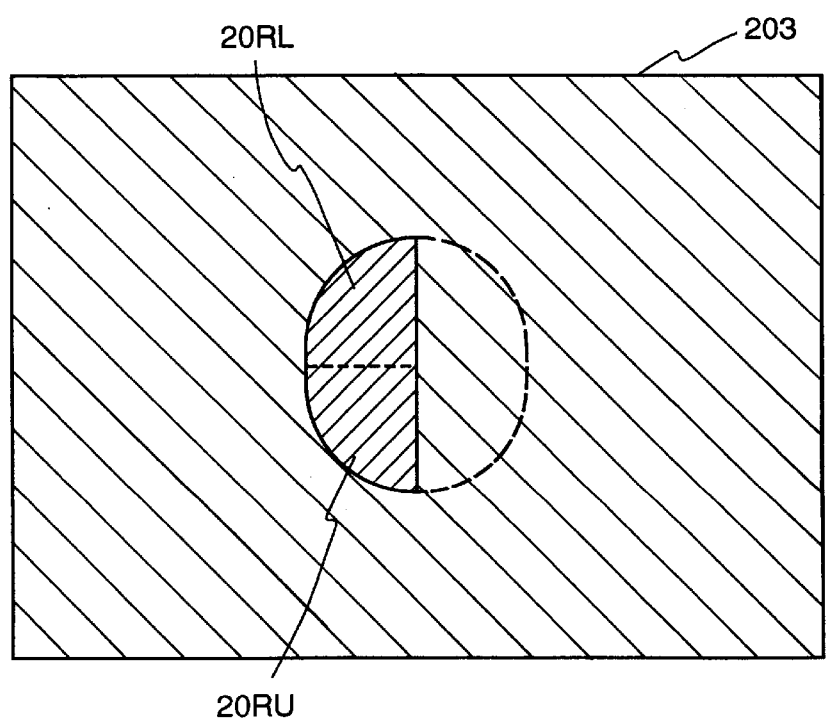
FIG. 26 is a view for explaining the principle of generating back light graphic patterns in the seventh embodiment.

The right-half portion of the face of the viewer illuminated by the infrared lamp 208 arranged in front of the viewer off to the right is picked up by the infrared television camera 206 and binarized by the image processor 207. The result is a right-half face image 20R of the viewer, FIG. 25, in which a bright portion exists on the left-hand side. Subsequently, for the same reason the face image of the viewer is vertically inverted in the first embodiment (i.e., to ensure the ability to follow the vertical movement of the viewer), the image processor 207 vertically inverts the image data of the resulting face image. Consequently, as illustrated in FIG. 26, a lower region 20RL of the right-half face is displayed in the upper portion, and an upper region 20RU is displayed in the lower portion. If there is only one viewer, the display screen of the liquid crystal display 203 is divided into two regions as shown in FIG. 26; that is, a region (a portion which is indicated by the hatch going down to the left for convenience) which corresponds to the right-half portion of the face of the viewer, and the other region (a portion indicated by the hatch going down to the right).

In FIG. 26, therefore, the image processor 207 performs a light-emission display having a vertical polarizing axis (X axis) for the pixels in the portions (20RL and 20RU) corresponding to the right-half face of the viewer, i.e., in the region from which the right-eye polarized light is to be emitted. The image processor 207 performs a light-emission display having a horizontal polarizing axis (Y axis) in the other portion, i.e., in the region (the hatched portion going down to the right in FIG. 26) from which the left-eye polarized light is to be emitted. For this purpose, the image processor 207 applies a voltage of, e.g., "1", to the liquid crystal molecules in the region (the portion indicated by the hatch going down to the left for convenience) which corresponds to the right-half portion of the face of the viewer, and applies a voltage of, e.g., "0", to the liquid crystal molecules in the other region (the hatched portion going down to the right).

Figure 27:
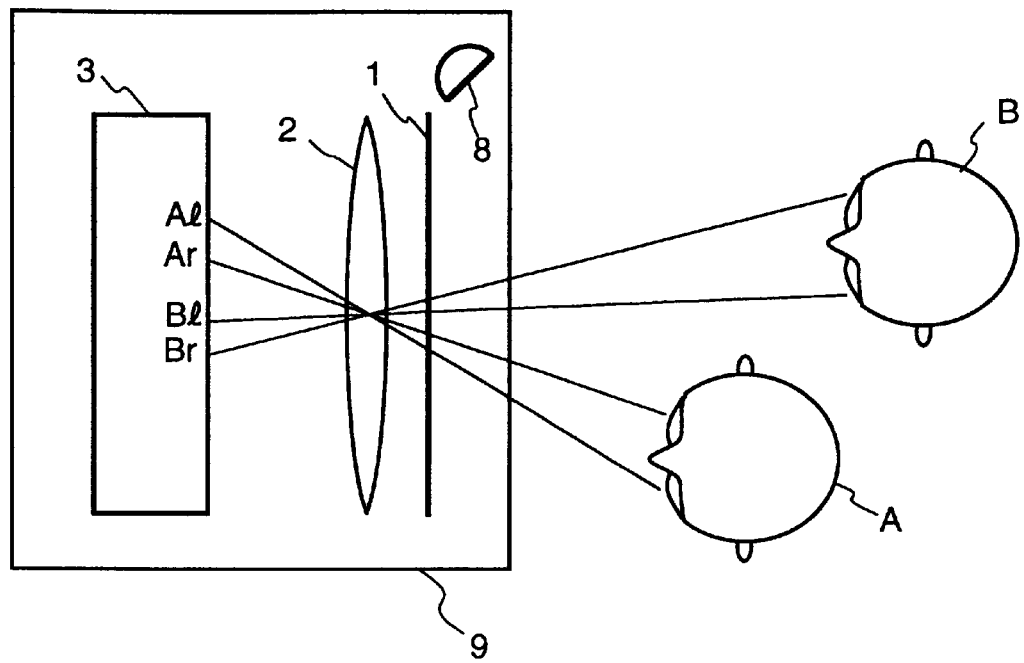
FIG. 27 is a view for explaining the principle of allowing the viewer to obtain a stereoscopic vision in the seventh embodiment.
Figure 28:
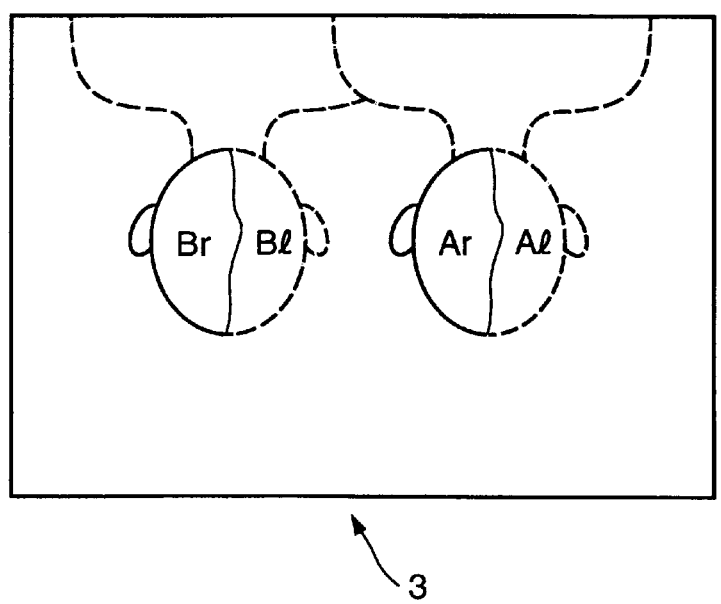
FIG. 28 is a view for explaining the principle of allowing the viewer to obtain a stereoscopic vision in the seventh embodiment.

FIG. 27 is a view showing the optical paths when this stereoscopic image display apparatus is viewed from the above. FIG. 28 illustrates the state of the display screen of the monochrome liquid crystal television display 203. Referring to FIGS. 27 and 28, in the monochrome liquid crystal television display 203, regions corresponding to right-half images Ar and Br of the faces of viewers A and B emit light having the vertical polarizing axis (X axis), and the other region including Al and Bl emits light having the horizontal polarizing axis (Y axis). As a consequence, the right eye of the viewer A sees the region Ar through the Fresnel convex lens 202, and the left eye of the viewer A sees the region Al through the Fresnel convex lens 202. Similarly, the right and left eyes of the viewer B see the regions Br and Bl, respectively. Accordingly, the light with the vertical polarizing axis is incident on the right eyes of the viewers A and B, and the light with the horizontal polarizing axis is incident on their left eyes. At this time the color liquid crystal display 201 displays the right-eye target image such that the image has the vertically polarized light transmission characteristic, and displays the left-eye target image such that the image has the horizontally polarized light transmission characteristic. Consequently, the right eyes of the viewers A and B see only the right-eye target image, and their left eyes see only the left-eye target image. The result is that a stereoscopic image is viewed.

Figure 29:
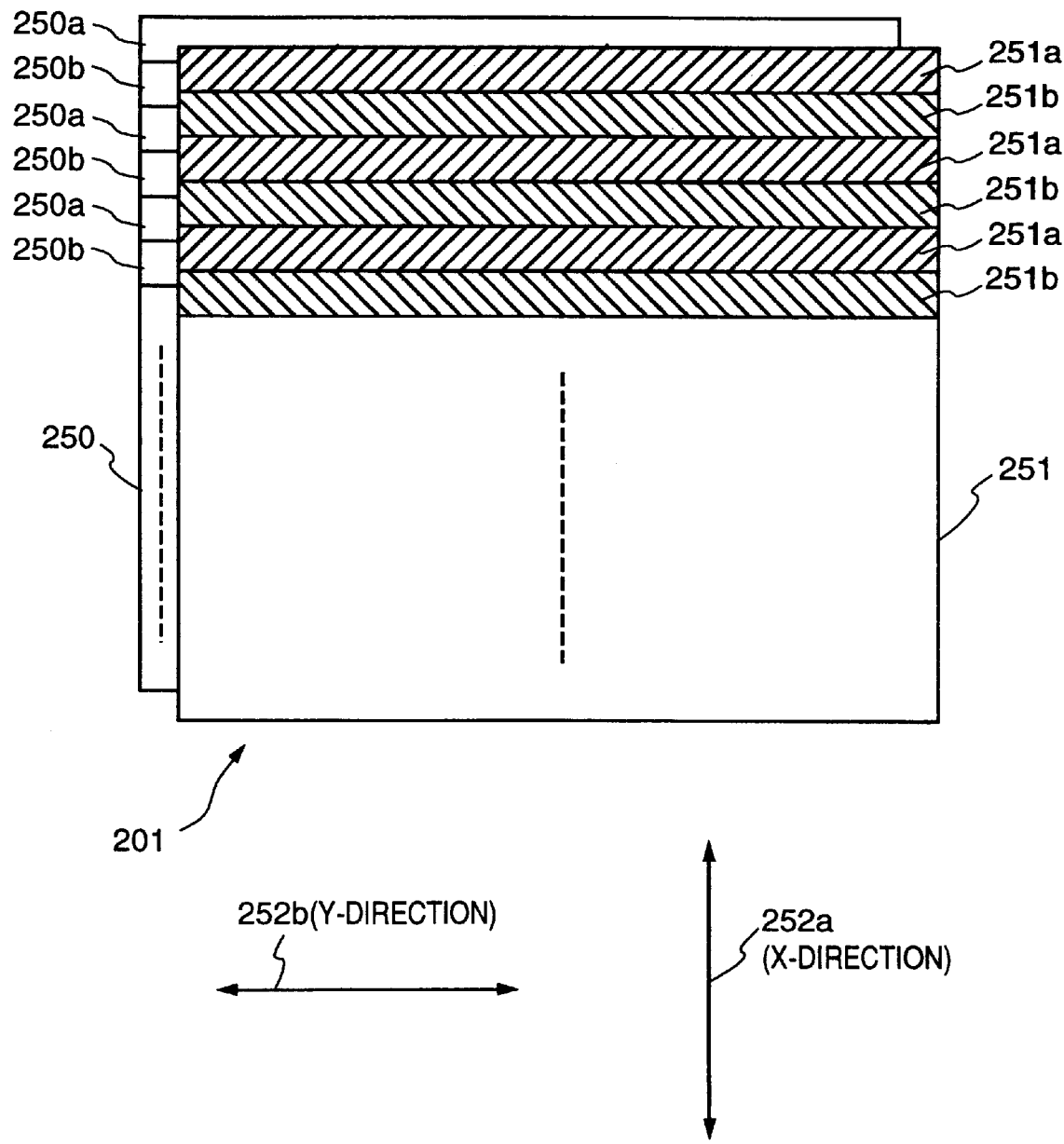
FIG. 29 is a view showing the arrangement of a display for displaying target images in the seventh embodiment.
Figure 30:
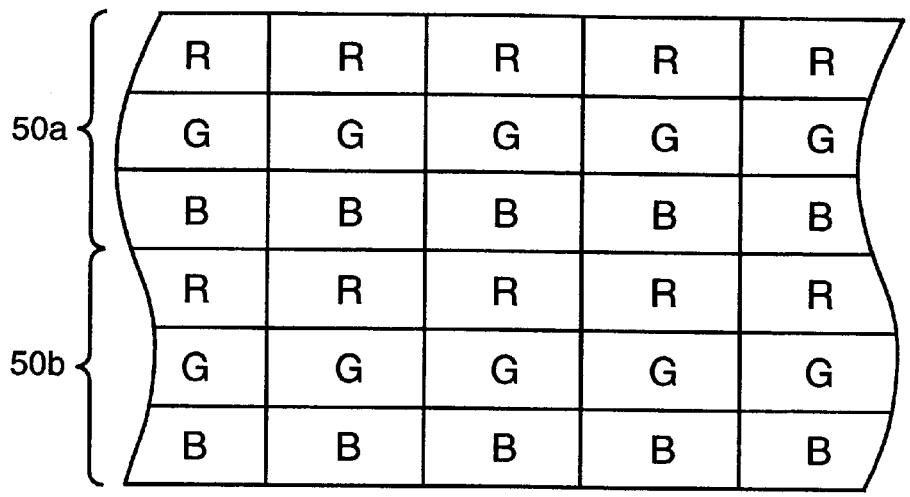
FIG. 30 is a view showing the arrangement of the display for displaying target images in the seventh embodiment.

FIG. 29 shows the structure of the back light incident surface of the color liquid crystal display 201 shown in FIG. 24. Reference numeral 250 denotes the rear surface of the liquid crystal panel display screen; 250a, portions for displaying the right-eye target image of a pair of target images to be displayed on the liquid crystal panel display screen 250; and 250b, portions for displaying the left-eye target image of the pair of target images. As illustrated in FIG. 30, these portions 250a and 250b are alternately arranged in units of pixels in the horizontal direction of the color liquid crystal display 201. A polarizer 251 adhered to the rear surface of the liquid crystal panel display screen 250 has two kinds of regions 251a and 251b. The regions 251a are portions having a property of transmitting light polarized in the X direction indicated by an arrow 252a. The regions 251b are portions having a property of transmitting light polarized in the Y direction indicated by an arrow 252b which is perpendicular to the arrow 252a. The regions 251a and 251b are alternately arranged into a strip-like shape. The polarizing portions 251a are aligned with the right-eye target image display regions 250a, and the polarizing regions 251b are aligned with the left-eye target image display regions 250b. With this alignment, the right-eye target image is given a polarizing characteristic in the same direction (the vertical direction X) as that of the arrow 252a and output from the display 250. On the other hand, the left-eye target image is given a polarizing characteristic in the same direction (the horizontal direction Y) as that of the arrow 252b and output from the display.

The time-divisionally output stereo video signal from the stereo image output device 204, FIG. 24, is applied to the matrix circuit 205. Since this stereo video signal contains the right-eye target image and the left-eye target image in an interlaced manner, the right-eye target image drives the pixels of the color liquid crystal television display 201 at positions (251a) at which polarizers capable of selecting the right-eye back light exist. The left-eye target image, on the other hand, drives the pixels of the color liquid crystal television display 201 at positions (251b) at which polarizers capable of selecting the left-eye back light exist.

The distance, y, between the Fresnel convex lens 202 and the monochrome liquid crystal television display 203 is preferably determined on the basis of the focal length, f, of the Fresnel convex lens 202 and the distance, x, between the expected viewing position of the viewer and the color liquid crystal display 201.
If y is determined by $$y = \frac{f \cdot x}{x - f}$$

this means that the display screen of the monochrome liquid crystal television display 203 is positioned on the focal plane of the Fresnel convex lens 202 when viewed from the viewer. This enables the display screen to act as a back light with a higher luminance. In this embodiment it is assumed that the position of the viewer is separated by 2400 mm from the color liquid crystal display 201.

As described above, according to the image display apparatus of the seventh embodiment it is possible to provide a small-sized stereoscopic image display apparatus capable of displaying stereoscopic images in a time parallel manner without using any special spectacles.

Modifications of the Seventh Embodiment

Various modifications of the seventh embodiment can be proposed.

Figure 31:
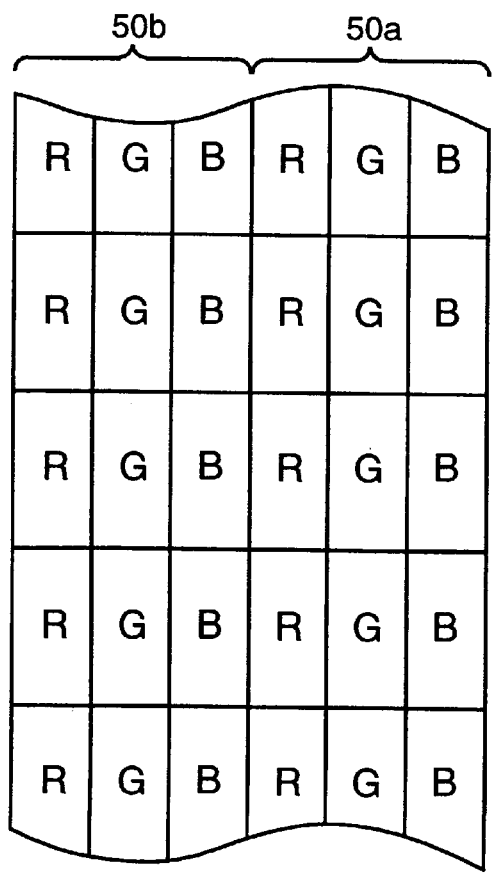
FIG. 31 is a view showing the arrangement of a display according to one modification of the seventh embodiment.

In the seventh embodiment, the portions 250a and 250b and the regions 251a and 251b are respectively, alternately arranged in units of pixels in the horizontal direction, as illustrated in FIG. 30. However, a similar effect can be obtained by alternately arranging these portions and regions in units of pixels in the vertical direction, as shown in FIG. 31.

In addition, the effect of the Fresnel convex lens 202 can also be attained by using any of a large convex lens, a holographic lens, a diffraction grating lens, a monofoc lens, and a concave mirror.

It is also possible to use an automatic focusing camera as the television camera 206 for sensing the viewer. In this case conveniently the distance y between the Fresnel convex lens 202 and the monochrome liquid crystal television display 203 is automatically adjusted in synchronism with the focus adjustment driving of the automatic focusing camera such that an image of the face of the viewer is formed on the display screen of the monochrome liquid crystal television display 203. Furthermore, to increase the efficiency as the back light, any of a large convex lens, a Fresnel convex lens, a holographic lens, a diffraction grating lens, and a monofoc lens can be disposed, in addition to the Fresnel convex lens 202, on the display screen of the monochrome liquid crystal television display 203.

The television camera 206 can also be arranged on the optical axis of the Fresnel convex lens 202 by using a half mirror or the like.

The infrared lamp 208 can be a visible-radiation lamp or an ultraviolet lamp so long as the sensitivity of the television camera 206 is high enough to sense the radiation. The position of the infrared lamp 208 can also be an arbitrary position provided that the position is not against the gist of the present invention. The infrared lamp 208 is not necessarily required in performing image processing to be described later. It is also possible to detect the position of the viewer by using detection processing using microwaves or ultrasonic waves, perform image processing on the basis of the detected position, and determine the display region on the monochrome liquid crystal television display 203. In this case the television camera 206 is not necessarily required.

The display region on the monochrome liquid crystal television display 203 need not be based on an image of the half portion of the face of the viewer. That is, any binary image can be used as long as the image functions as a proper back light for a stereoscopic image distribution with respect to the right and left eyes of the viewer. Furthermore, the binary image can be obtained by using a plurality of television cameras 206 or by processing the image of the viewer.

It should be noted that the conditions of the right- and left-half images of the face of the viewer picked up by the television camera 206 and the conditions of the polarizing directions of the monochrome liquid crystal television display 203 and the color liquid crystal display 201 in this embodiment are merely examples, and so exactly the same effect as in this embodiment can be obtained by interchanging the conditions of the right- and left-half images of the face or of the vertical and horizontal polarizing directions.

Moreover, the polarizer on the back light incident side of the color liquid crystal display 201, i.e., the polarizer constituted by a film made from a crystal or liquid crystal can be adhered to the display in any arbitrary form provided that the form is not against the gist of the present invention. Also, the polarizer can be arranged on the display screen side of the color liquid crystal display 201.

In the seventh embodiment, the image input from the video tape recorder is used in unidirectional communication. This image input can also be used in bi-directional communication, e.g., in multimedia, game machines, or television phones.

Modifications of the First to Seventh Embodiments

In each of the apparatuses of the first to seventh embodiments, a similar effect can be obtained by attaching the illuminating device to the head of each viewer.

In the seventh embodiment, a single display device is used to display the right- and left-eye back light graphic patterns. However, it is also possible to use two display devices to display the right- and left-eye back light graphic patterns, respectively. In a stereoscopic image display apparatus according to this modification, a means which displays graphic patterns based on the right- and left-half portions of the face of the viewer on a pair of display devices and synthesizes these graphic patterns is used as a back light graphic pattern display device. One of the right- and left-half portions of the face of the viewer is picked up using a camera and a lamp, and a graphic pattern based on the picked up half-face image is displayed on one of the display devices. A negative-to-positive inverted image of the graphic pattern based on the half-face image is displayed on the other display device. This allows a single image sensing device to have functions of two devices.

In addition, the infrared illuminating device can be fixed to the head of the viewer by using, e.g., a head band, so as to illuminate the left- or right-half portion of the face of the viewer. Consequently, the half portion of the face of the viewer can be readily illuminated.

Furthermore, instead of using the infrared illuminating device, the viewer can wear a mask or a cap which is so processed as to fluoresce. In this case an area corresponding to either the left- or right-half portion of the face can be made emit light by illumination with a light source which causes the mask or the cap to fluoresce.

The stereoscopic image display apparatus of the present invention can employ a detector for detecting the position of the viewer, instead of using the camera. In this case the right- and left-half portions of the face of the viewer need not be displayed on the back light graphic pattern display device. That is, any graphic pattern can be used which functions as the illumination source of the display device for displaying target images. Therefore, it is only necessary to display predetermined graphic patterns at positions corresponding to the right- and left-half portions of the face of the detected viewer.

As the detector for detecting the position of the viewer, it is possible to use an ultrasonic device or a device which detects radio waves or magnetism emitted from a transmitter attached to the head of the viewer.

As many apparently widely different embodiments of the present invention can be made without departing from the spirit and scope thereof, it is to be understood that the invention is not limited to the specific embodiments thereof except as defined in the appended claims.

What is claimed is:

1. An image display apparatus which shows a viewer a first image and a second image different from the first image, said apparatus comprising:
   a spatial modulation device of light transmission type, for displaying the first and second images so that areas of the spatial modulation device displaying the images exhibit different transmission characteristics for polarized light from each other;
   a back lighting device arranged behind said spatial modulation device for illuminating said spatial modulation device from a back surface, said back lighting device displaying first and second graphic patterns at respective locations thereof corresponding to the viewer's right and left eyes, respectively; and
   an optical element arranged before said back lighting device to provide the viewer's right and left eyes with light beams from the first and second graphic patterns, respectively,
   wherein said back lighting device displays the first and second graphic patterns so that the first and second graphic patterns have respective polarization characteristics which match the transmission characteristics for polarized light of the first and second images displayed on the spatial modulation device.

2. The apparatus according to claim 1, wherein polarizing axes of polarized light components of the first and second graphic patterns are substantially orthogonal to each other.

3. The apparatus according to claim 1, further comprising synthesizing means for synthesizing two image light components by aligning optical axes of the image light components,
   wherein said back lighting device comprises
      a first display unit for emitting light which is transmitted through said synthesizing means,
      a second display unit for emitting light which is reflected by said synthesizing means,
      a polarizer provided on a display screen of said first display unit to impart the first polarization characteristic to the light emitted by said first display unit, and
      a polarizer provided on a display screen of said second display unit to impart the second polarization characteristic to the light emitted by said second display unit, and
      displays the first graphic pattern on said first display unit and the second graphic pattern on said second display unit.

4. The apparatus according to claim 1, wherein the display screen of said back lighting device is arranged outside a focal length of said optical element.

5. The apparatus according to claim 1, wherein said optical element has directivity.

6. The apparatus according to claim 5, wherein said optical element is a convex lens, a Fresnel convex lens, a holographic lens, a diffraction grating lens, a monofoc lens, or a concave mirror.

7. The apparatus according to claim 1, wherein said spatial modulation device has a liquid crystal display for simultaneously displaying the first and second images on a screen.

8. The apparatus according to claim 7, wherein said liquid crystal display comprises:
   a display screen having a first display region including a large number of fine display regions, and a second display region including a large number of fine display regions mixed with said fine display regions of said first display region; and
   a polarizer having a first polarizing region which is a polarizing region provided behind said first display region and has a large number of polarizing units in a one-to-one correspondence with said fine display regions of said first display region, and a second polarizing region which is a polarizing region provided behind said second display region and has a large number of polarizing units in a one-to-one correspondence with said fine display regions of said second display region.

9. The apparatus according to claim 8, wherein said fine display regions of said first display region are band-like display portions divided along a horizontal or vertical direction of said display screen of said liquid crystal display.

10. The apparatus according to claim 1, further comprising:
    detecting means for detecting a position of the viewer; and
    means for moving the display positions of the first and second graphic patterns on said back lighting device in accordance with the position detected by said detecting means.

11. The apparatus according to claim 10, wherein said detecting means includes an illuminating device for illuminating the viewer, an image sensing device for sensing the illuminated viewer, and said image display apparatus further comprises:
- means for generating one of the first and second graphic patterns on the basis of one of right- and left-half images of the face of the viewer obtained by said image sensing device.

12. The apparatus according to claim 11, wherein said back lighting device comprises:
- a plurality of light-emitting elements capable of selectively emitting polarized light with the first polarization characteristic or polarized light with the second polarization characteristic upon being selectively applied with two voltage values;
- means for extracting a region corresponding to the right eye of the viewer from the face image of the viewer obtained by said sensing means; and
- means for applying a first voltage value to a display region on said back lighting device, which corresponds to said extracted region corresponding to the right eye, thereby causing said display region to display the first graphic pattern, and applying a second voltage value to a display region on said back lighting device, which corresponds to a region other than said extracted region corresponding to the right eye, thereby causing said display region to display the second graphic pattern.

13. The apparatus according to claim 11, wherein said illuminating device emits infrared radiation.

* * * * *

UNITED STATES PATENT AND TRADEMARK OFFICE
CERTIFICATE OF CORRECTION

PATENT NO.     : 6,011,580
DATED          : January 4, 2000
INVENTOR(S)    : Tomohiko Hattori, et al.

Page 1 of 1

It is certified that error appears in the above-identified patent and that said Letters Patent is hereby corrected as shown below:

<u>Title page,</u>
[56] References Cited: Foreign Patent Documents 63-194497 8/88 Japan Signed and Sealed this Eighteenth Day of September, 2001

Attest:

*Nicholas P. Godici*

NICHOLAS P. GODICI
*Attesting Officer*   *Acting Director of the United States Patent and Trademark Office*